United States Patent
Yanagida et al.

[11] Patent Number: 5,899,793
[45] Date of Patent: May 4, 1999

[54] LAPPING APPARATUS INCLUDING A LAPPING BASE HAVING PADS

[75] Inventors: Yoshiaki Yanagida; Kazuo Yokoi; Koji Suto; Motoichi Watanuki; Tomokazu Sugiyama, all of Kamikodanaka, Japan

[73] Assignee: Fujitsu, Ltd., Kawasaki, Japan

[21] Appl. No.: 08/954,131

[22] Filed: Oct. 20, 1997

[30] Foreign Application Priority Data

Apr. 10, 1997 [JP] Japan .................................... 9-092434

[51] Int. Cl.⁶ .............................. B24B 49/00; B24B 51/00
[52] U.S. Cl. .............................. 451/8; 451/278; 451/279; 451/387; 451/389; 451/405
[58] Field of Search ................................ 451/8, 278, 279, 451/387, 389, 405

[56] References Cited

U.S. PATENT DOCUMENTS

| | | | |
|---|---|---|---|
| 4,850,157 | 7/1989 | Holmstrand | 451/272 |
| 5,749,769 | 5/1998 | Church et al. | 451/5 |
| 5,816,899 | 10/1998 | Hart et al. | 451/272 |

*Primary Examiner*—Timothy V. Eley
*Assistant Examiner*—Shantese McDonald
*Attorney, Agent, or Firm*—Greer, Burns & Crain Ltd.

[57] ABSTRACT

A lapping apparatus for uniformly laps work pieces. The lapping apparatus includes a rotary lapping plate, a lapping base including a plurality of pads contacting the lapping plate, an adapter including first and second surfaces for supporting the mounting base contacting the lapping plate, and a supporting mechanism provided on the lapping base for supporting the second surface of the adapter by a supporting point. As the adapter supporting the work piece is supported on two points on the work piece and one supporting point of the lapping plate, the lapping surface of the work piece may follow as the lapping plate. Accordingly, it becomes possible to uniformly lap the work piece regardless of accuracy of the lapping base.

16 Claims, 27 Drawing Sheets

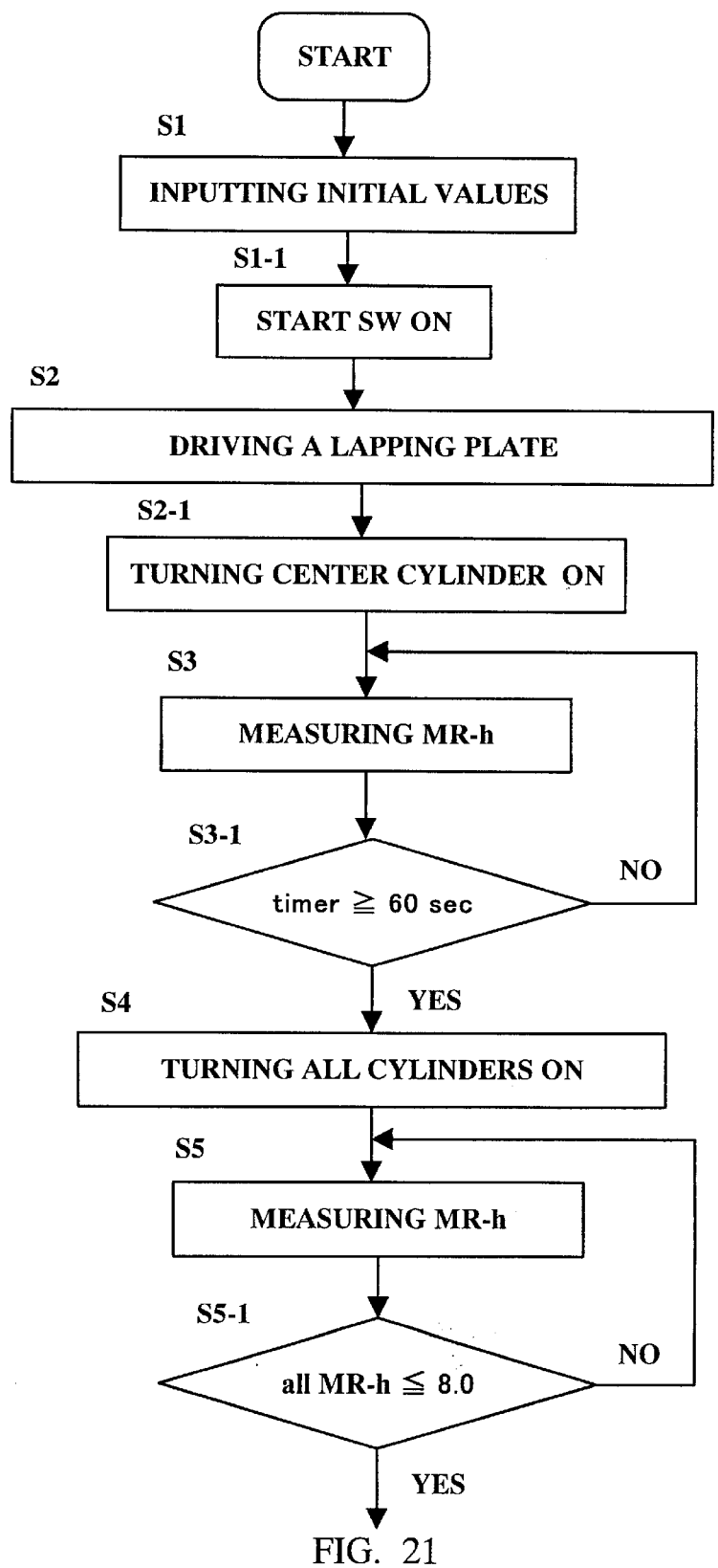

LAPPING APPARATUS INCLUDING A LAPPING BASE HAVING PADS

BACKGROUND OF THE INVENTION

1. Field of the Invention

The present invention relates to a lapping apparatus to lap a work piece. More particularly, it relates to a lapping apparatus to lap a work piece with high accuracy.

For example, after forming a magnetic head thin film, the magnetic head thin film is lapped on the process of manufacturing a magnetic head. Heights of a magnetic resistance layer and a gap of the magnetic head thin film of the magnetic head are made to have a certain constant by lapping on the manufacturing process of the magnetic head.

For the heights of the magnetic resistance layer and the gap, sub-micron order of accuracy is required. Therefore, it is necessary to lap work pieces or magnetic thin films with high accuracy.

2. Description of the Related Art

FIGS. 23A and 23B are explanatory diagrams of a composite type magnetic head.

As shown in FIG. 23A, the composite type magnetic head includes a magnetic resistance element 82 formed on a base plate 81 and a writing element 85. The magnetic resistance element 82 is formed of a magnetic resistance film 83 and a pair of conducting films 84. A resistance value of the magnetic resistance element 82 is varied by an external magnetic field. The magnetic resistance element 82 has a function to read out an electric current having a value according to magnetic field strength of a track 90 on a magnetic disk.

As the magnetic resistance element 82 is an element for reading out the current, it is required to provide a different element 85 for writing. The writing element 85 includes an inductive head. The inductive head is comprised of a lower magnetic pole 86, an upper magnetic pole 88 faced to the lower magnetic pole 86 with a certain gap, and a coil 87 provided between the lower and upper magnetic poles 86 and 88 to magnetically excite them. A non-magnetic insulating layer 89 is provided around the coil 87.

In such the composite type magnetic head, it is required to have a constant resistance value of the magnetic resistance film 83 in the magnetic resistance element 82 for each magnetic head. However, it is difficult to make the resistance value be constant or uniform on the process of manufacturing the thin film for the magnetic head. Therefore, after forming the thin film of the magnetic head, a height (width) h of the magnetic resistance film 83 is adjusted so that a resistance value may be uniformed.

FIGS. 24A, 24B, 25A, 25B, 25C and 25D are diagrams explaining the process of manufacturing the composite type magnetic head.

As shown in FIG. 24A, a plurality of composite type magnetic heads are formed on a semiconductor wafer 100 by a thin film technique. Next, as shown in FIG. 24B, the wafer 100 is cut into strips to make a plurality of row bars 101. A row bar 101 includes a plurality of the magnetic heads 102 arranged in one row. Resistance elements 102a are provided on the left and right ends, and at the center of the row bar 101 for monitoring the process of the manufacturing.

As described above, the height of the magnetic resistance film 83 for the magnetic head 102 is lapped to be constant or uniform. However, the row bar 101 is extremely thin, for example, about 0.3 mm. It is, therefore, difficult to mount the row bar 101 directly to a lapping jig, and as shown in FIG. 24C, the row bar 101 is bonded to a mounting tool or base 103 with heat dissoluble wax.

Then, as shown in FIG. 25A, the row bar 101, which is bonded to the mounting base 103, is placed on a lapping plate 104 for lapping the row bar 101. As known in Japanese Unexamined patent application published No. 2-124262 (U.S. Pat. No. 5,023,991) or Japanese Unexamined patent application published No. 5-123960, the resistance value of the resistance element 102a for monitoring is always measured while lapping the row bar 101. Then, it can be detected whether or not the magnetic resistance film of the magnetic head 102 has become a targeted height.

When it is detected by the measurement of the resistance value that the magnetic resistance film has been lapped to the targeted height, the lapping processing is stopped. After that, a slider can be formed on a bottom surface 101-1 of the row bar 101, as shown in FIG. 25B.

The row bar 101 is further cut into a plurality of magnetic heads 102, as the row bar 101 is mounted on the mounting base 103 as shown in FIG. 25C. Each magnetic head 102 is taken out from the mounting base 103 by heating and melting the heat dissoluble wax, as shown in FIG. 25D.

In this way, a row bar 101 including a plurality of the magnetic heads 102 is prepared, and lap processing is performed for the row bar 101. Therefore, the magnetic resistance film on the plurality of magnetic heads 102 can be lapped by one step.

FIG. 26 is an explanatory diagram of a conventional lapping apparatus, and FIG. 27 is a diagram explaining a supporting mechanism for work piece.

The lapping apparatus has a rotary lapping plate 104, as shown in FIG. 26. A supporting block 105 has three pads 105a contacting to the lapping plate 104. The pads 105a smoothly spread slurry (abrasive liquid) on the lapping plate 104 and fill the slurry into the lapping plate 104. The pads 105a, further, may soften pressure of the supporting block 105 to the surface of the lapping plate 104.

The supporting block 105 is swung on the lapping plate 104 by a swing mechanism 106. The supporting block 105 supports the mounting base 103. Therefore, the row bar 101, which is bonded to the mounting base 103, is lapped by the rotation of the lapping plate 104 and the swing of the block 105.

As shown in FIG. 27A, the mounting base 103 was directly mounted to the supporting block 105 in the conventional apparatus. Therefore, the block 105 follows the lapping plate 104. Thereby, the work piece 101 is lapped.

As explained above, the mounting base 103 was directly mounted to the supporting block 105 following to the lapping plate 104 in the conventional apparatus, and therefore, accuracy (the degree of a right angle) between the following surface of the block 105 and the mounting surface of the block 105 should be required. If the following surface of the block 105 is not exact at a right angle to the mounting surface of the block 105, as shown in FIG. 27B, the row bar 101 bounded to the mounting base 103 may be lapped as inclined to the lapping plate 104. Therefore, the row bar 101 which is bonded to the mounting base 103 is diagonally lapped by the lapping plate 104.

When accuracy is required in sub-microns for a work piece such as the row bar 101, it is difficult to uniformly lap the work piece. It has taken too much time to accurately obtain the right angle between the surfaces of the block 105.

In addition, it has been extremely difficult to keep the accuracy between the following processing surface of the block 105 and the mounting surface, as the surfaces on the block 105 are wearing according to frequencies of the use.

SUMMARY OF THE INVENTION

Accordingly, it is an object of the present invention to provide a lapping apparatus to lap a work piece with high accuracy.

It is another object of the present invention to provide a lapping apparatus, which may uniformly lap a work piece.

Further objects of the present invention will be clear from the description of the preferred embodiments accompanied with the attached drawings.

DESCRIPTION OF THE PREFERRED EMBODIMENTS

Figure 1:
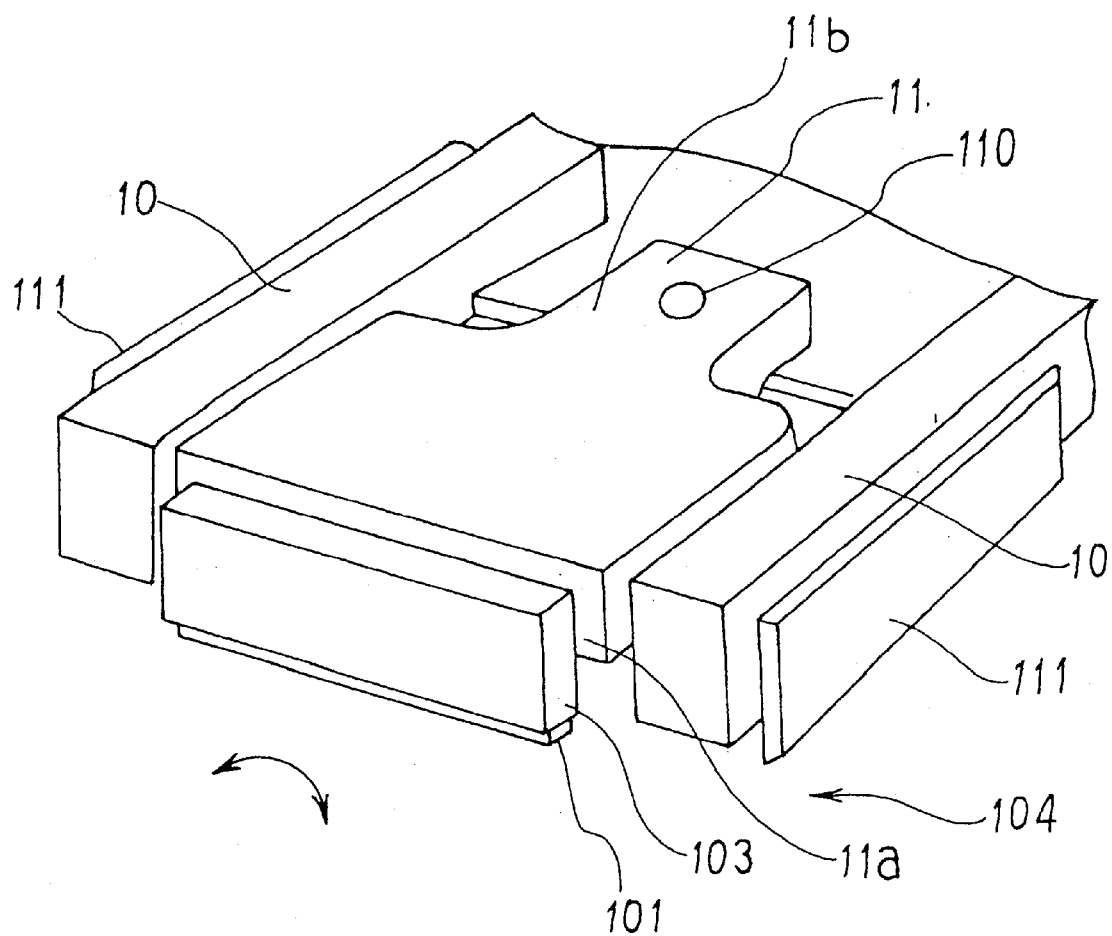
FIG. 1 is a principle diagram of the present invention.

Embodiments according to the present invention will be now explained in accompanying with the attached drawings. Throughout the following descriptions, the same reference numerals and symbols are used to denote and identify corresponding or identical components.

FIG. 1 is an principle diagram of the present invention.

A lapping apparatus according to the present invention includes a rotary lapping plate 104 (not shown in the diagram), a lapping base 10 having a plurality of pads 111 contacting to the lapping plate 104, an adapter 11 having a first surface 11a supporting a mounting base 103, to which a work piece 101 is bonded, contacting the lapping plate 104 and a second surface 11b faced at a right angle to the first surface 11a, and a supporting mechanism 110 provided on the lapping base 10 for supporting the second surface 11b of the adapter 11 on one supporting point.

In the present invention, the mounting base 103 is provided on the adapter 11 which is supported by one point of the lapping base 10. Therefore, the lapping surface of the work piece 101 bonded to the mounting base 103 can be moved independently from the lapping base 10. As the adapter 11 supporting the mounting base 103 is supported on three points of two points on both ends of the mounting base 103 and the above-described one supporting point, the lapping surface of the work piece 101 may follow the lapping plate for lapping processing.

In this way, the work piece 101 is lapped based on the lapping plate 104. Therefore, it becomes possible to lap the work piece 101 smoothly regardless of accuracy of the lapping base 10. Thereby, accuracy of lapping the work piece can be realized.

Figure 2:
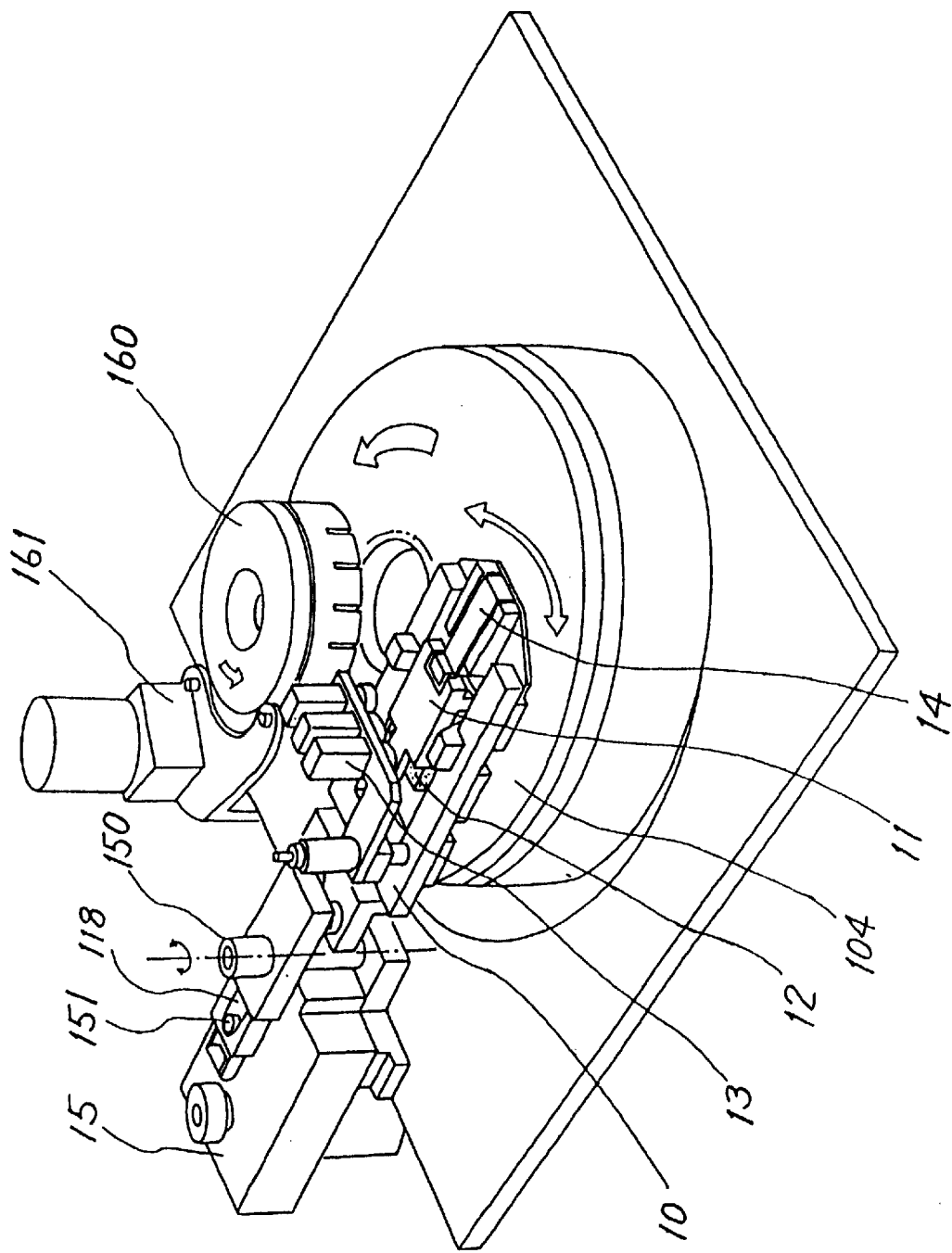
FIG. 2 is a perpendicular view of an example of a lapping apparatus employing the present invention.
Figure 3:
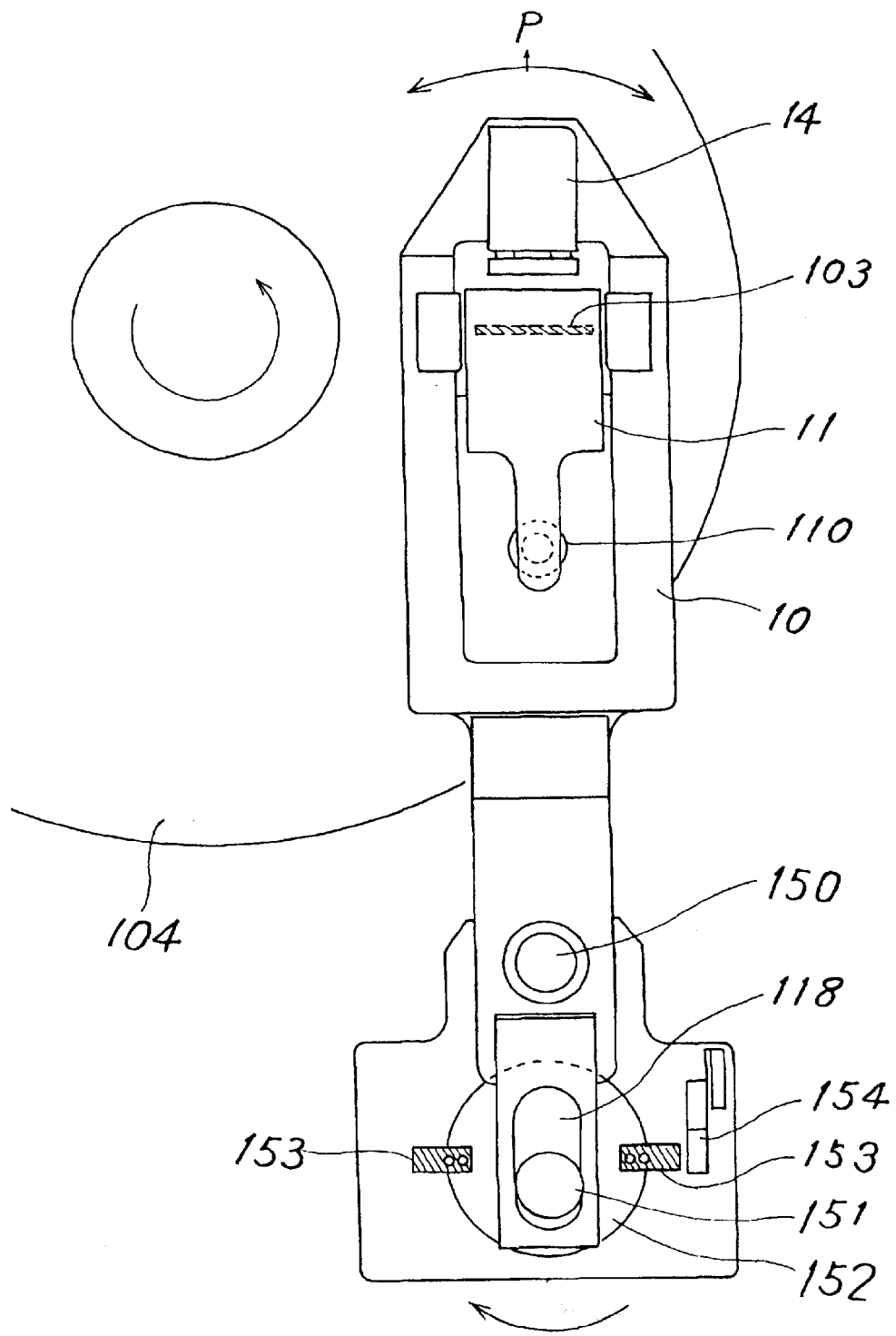
FIG. 3 is a top view of the lapping apparatus shown in FIG. 2.
Figure 4:
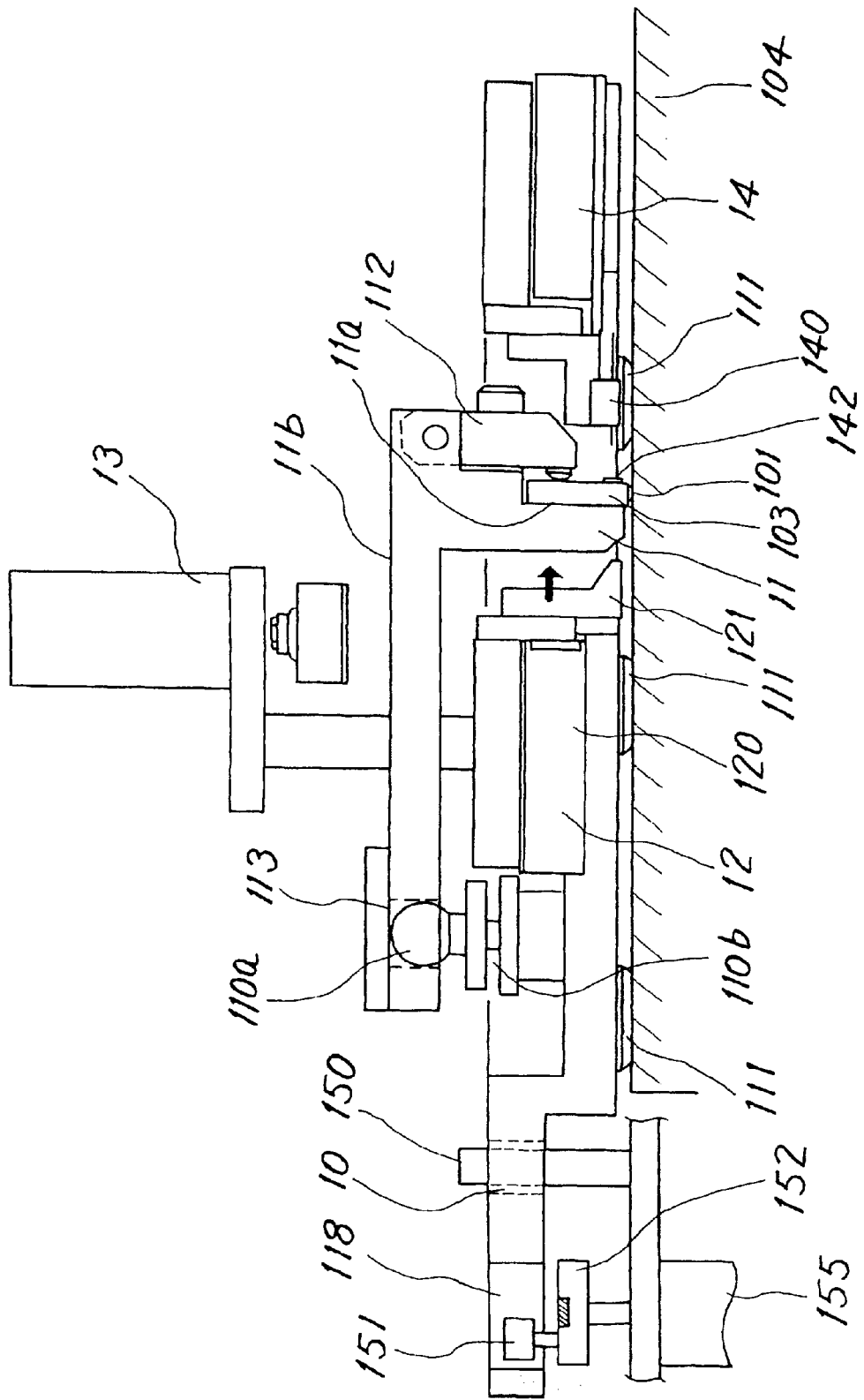
FIG. 4 is a side view of the lapping apparatus shown in FIG. 2.
Figure 5:
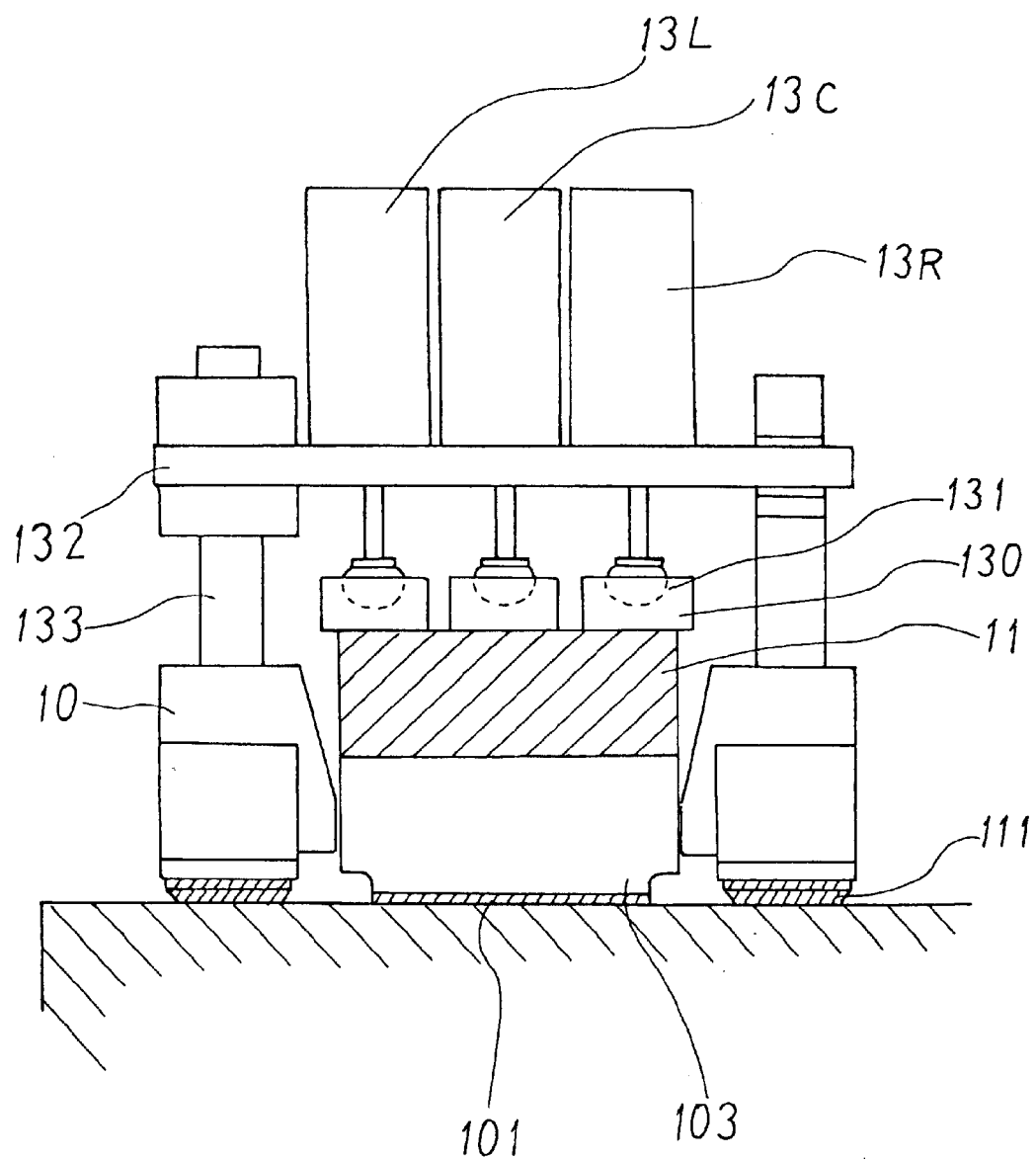
FIG. 5 is a cross sectional diagram of the lapping apparatus shown in FIG. 2.

FIG. 2 is a perpendicular view of one example of a lapping apparatus according to the present invention, FIG. 3 is a top view of the lapping apparatus of one embodiment according to the present invention, FIG. 4 is a side view of the lapping apparatus shown in FIG. 2, and FIG. 5 is a cross sectional view of the lapping apparatus shown in FIG. 2.

As shown in FIGS. 2, 3 and 4, the lapping plate 104 is rotated by a motor, not shown in the diagrams. Six pads 111 are provided under a lapping base 10. The lapping base 10 is set on a rotary shaft 150 fixed on the apparatus, so that the base 10 can be rotated around the shaft 150. A cam 118 is provided on other end of the lapping base 10.

A swinging mechanism 15 swings the lapping base 10. The swinging mechanism 15 has a swinging motor 155, a cam pulley 152 rotated by the swing motor 155, and a swing cam 151 provided on the cam pulley 152. A swinging cam 151 is engaged with a cam hole 118 of the lapping base 10, as shown in FIGS. 3 and 4.

Therefore, the lapping base 10 swings toward an arrow having both directions shown in FIG. 3 according to the rotation of the swinging motor 155. Two sensor actuators 153 are provided on a cam pulley 152. The sensor 154 detects the sensor actuators 153. The sensor actuators 153 are positioned so as to be detected by the sensor 154 when the lapping base 10 is located on a point P, i.e., a central point of swinging, shown in FIG. 3.

Returning back to FIG. 2, a pressure mechanism 13, which is explained later, is provided on the lapping base 10. The pressure mechanism 13 puts pressure on the adapter 11. The adapter 11 is set on the lapping base 10. The adapter 11 is formed like a L formation as illustrated in FIG. 4. A mounting base 103 to which a work piece 101 is bonded is set on a first surface 11a of the adapter 11. The mounting base 103 is fixed to the first surface 11a of the adapter 11 by a fixing mechanism 112.

The adapter 11 has a second surface 11b. A holder 113 is provided on an end of the second surface 11b. A supporting mechanism 110 provided on the lapping base 10 has a screw 110b for adjusting the height, and a spherical supporting section 110a. The holder 113 of the adapter 11 is engaged with the supporting section 110a.

Therefore, the adapter 11 is supported by the lapping base 10 at one point. The adapter 11 contacts to a lapping plate 104 via the processing surface of the work piece 101. That is, the adapter 11 is supported by one point position of the supporting mechanism 110, and other two point positions, which are provided on both edges of the mounting base 103, to which the work piece 101 is bonded. Thereby, the mounting base 103 can be rotated around the center of the supporting mechanism so that the mounting base 103 can follow the lapping plate 104 independently from the lapping base 10.

Accordingly, the work piece 101 bonded to the mounting base 103 can be lapped by referencing the lapping plate 104 as a standard regardless of the accuracy of the lapping base 10. Thereby, it becomes possible to uniformly lap the work piece 101.

Returning back to FIG. 2, an unload mechanism 12 is provided on the lapping base 10. The unload mechanism 12 pushes the adapter 11 as shown in FIG. 4 so that the adapter 11 rotates around the supporting section 110a to evacuate the work piece 101 from the lapping plate 104. This unload mechanism 12 has an unload block 121 and an unload cylinder 120.

The probe mechanism 14 is provided on the end of the lapping base 10. The probe mechanism 14 electrically contacts to an resistance element for monitoring processing of the work piece, that is, the row bar 101 mounted to the mounting base 103. The probe mechanism 14 has a probe 140 electrically, which contacts to an resistance element for monitoring the processing.

Returning back to FIG. 2, a correction ring 160 is rotated by a modified ring rotary mechanism 161. The correction ring 160 expands slurry (abrasive liquid) and fills the slurry into the lapping plate 104, so that the flatness of the lapping plate 104 may be kept.

As shown in the cross sectional view of FIG. 5, the pressure mechanism 13 includes three pressure cylinders 13L, 13C and 13R. The pressure cylinders 13L, 13C and 13R are supported by a supporting plate 132. The supporting plate 132 can rotate around a rotary shaft 133. Therefore, when setting the adapter 11 to the lapping base 10, it is possible to release upper space of the lapping base 10 and set the adapter 11 to the lapping base 10 by rotating the supporting plate 132.

The pressure cylinder 13L on the left side puts pressure to a left portion of the adapter 11. The pressure cylinder 13C on center puts pressure on a center of the adapter 11. Further, the pressure cylinder 13R on the right portion puts pressure on a right portion of the adapter 11. A pressure block 130 is provided on the end of each of the pressure cylinders 13L, 13C and 13R. The pressure blocks 130 are supported by a spherical section 131. Accordingly, it is possible to uniformly put pressure power of the pressure cylinders onto the adapter 11.

Figure 6:
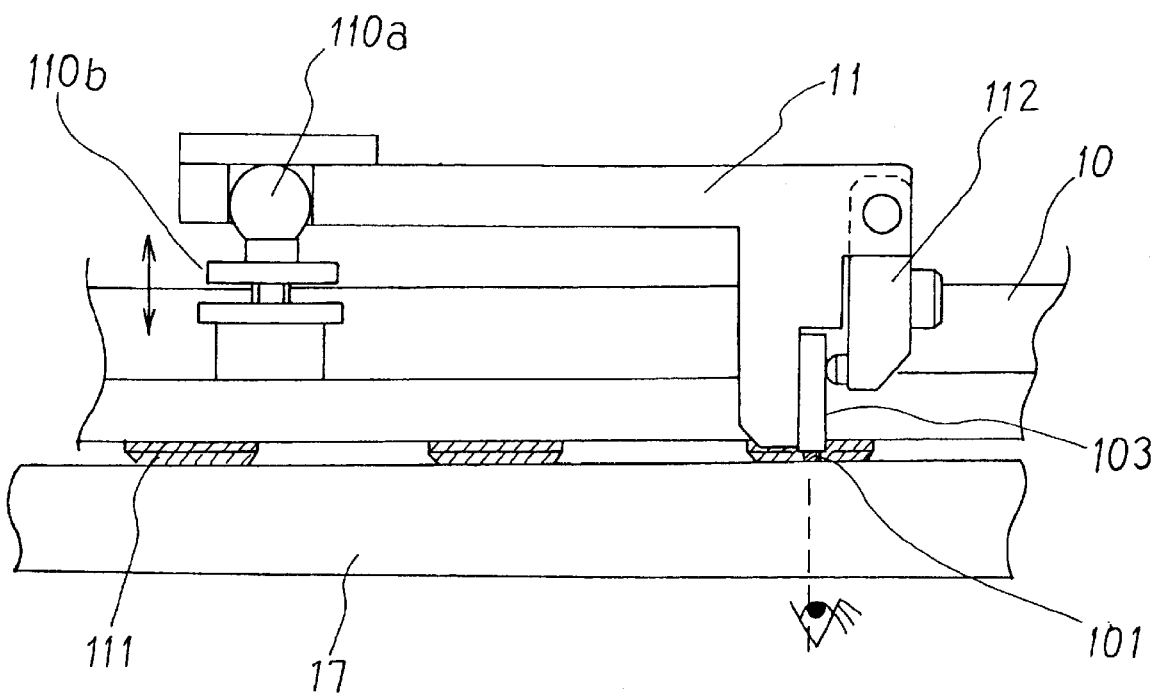
FIG. 6 is a diagram explaining control operation of a parallel degree in the work shown in FIG. 2.

FIG. 6 is an explanatory diagram of an operation for adjusting the degree of parallel of the work piece, and FIG. 7 is an explanatory diagram of the unload mechanism.

As the adapter 11 acts independent from the lapping base 10, it is required to adjust a degree of parallel between the row bar 101, which is mounted to the mounting base 103, and the lapping base 10. The height adjusting screw 110b is controlled to adjust the height of the supporting mechanism 110 so that the parallel degree between the row bar 101 and the lapping base 10 may be adjusted.

Therefore, the lapping base 10 on which the adapter 11 is set is positioned on an optical flat 17. Next, the height adjusting screw 110b is controlled as referencing interference fringes of the optical flat 17 on the position of the row bar 101. Thereby, the height of the adapter 11 can be adjusted so that the row bar 101 becomes parallel to the lapping base 10.

Figure 7A:
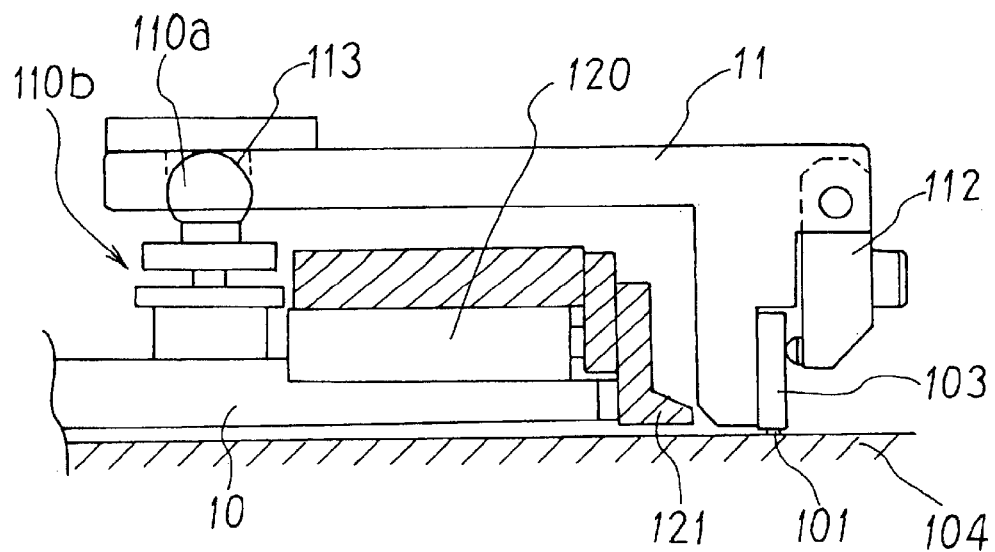
FIGS. 7A and 7B are explanatory diagrams of the unload mechanism shown in FIG. 2.
Figure 7B:
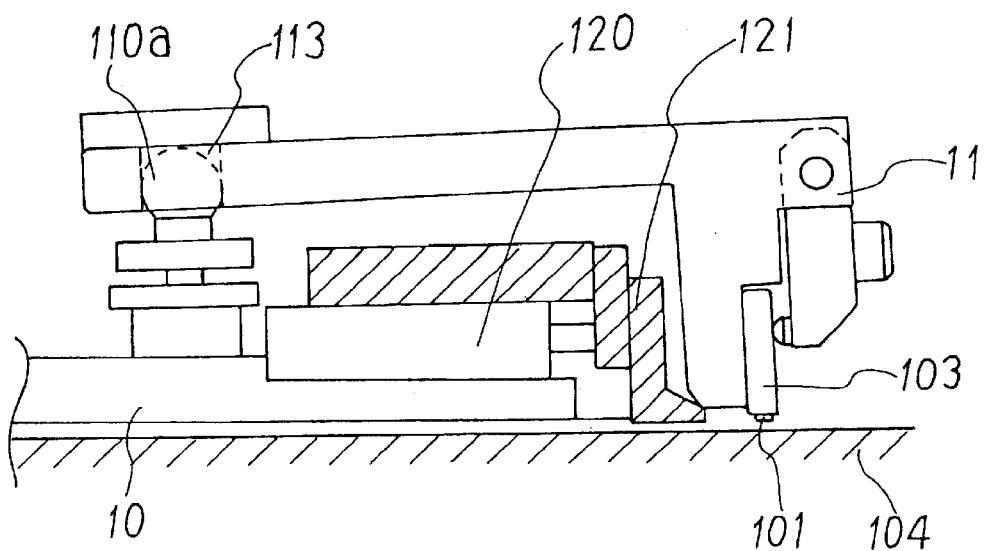

Unload operation will be now explained in accompanying with FIGS. 7A and 7B. When a value of a resistance for monitoring the lapping of the row bar 101 becomes a predetermined value, it is required to stop the lapping. When the rotation of the lapping plate 104 is stopped, lapping is stopped. However, the lapping plate 104 is stopped after reducing the speed by a stopping instruction. Therefore, the work piece should be lapped until the lapping plate 104 is finally stopped, thus causing dispersion of accuracy of the size of the work piece, that is, a row bar 101. Additionally, there is a case where a mark of the surface plate is put on the work piece.

Therefore, an unload cylinder 120 and an unload block 121 are provided on the lapping base 10 as shown in FIGS. 7A and 7B. As shown in FIG. 7B, the unload cylinder 120 is activated to stick the unload block 121 out when the value of the resistance for monitoring the lapping becomes the predetermined value. Then, the adapter 11 rotates above around the supporting section 110a to separate the row bar 101 from the lapping plate 104. Thereby, when the value of the resistance for monitoring the lapping becomes the predetermined value, lapping may be immediately stopped. Therefore, accuracy of the size of the row bar 101 can be realized. Further, as the adapter 11 is set on the lapping base 10, unloading of the work piece, that is, a row bar 101 becomes easy.

As shown in FIG. 3, when the sensor 154 detects that the actuators 153 are positioned at the point P, i.e., the central point of swinging, the unloading is performed. This is because the mark of the lapping plate 104 is put on the surface plate of the work piece according to the stopped position if the stop position of the swinging mechanism is random.

It is inclined to put the mark of the surface 104 on the work piece because speed of swinging becomes lower on both ends of swinging portion. On the contrary, the speed of swinging becomes highest at the center position P of swinging. Therefore, it is not easy to put the mark of the surface plate 104 on the work piece. The sensor 154 detects that the actuator 153, i.e., the sensor 154 detects that the lapping base 10 reaches to the center position P of swinging, unloading of the work piece is performed as described above. Thereby, it is possible to prevent from putting the mark of the surface plate 104 on the work piece 101 when the swinging mechanism stops.

Figure 8A:
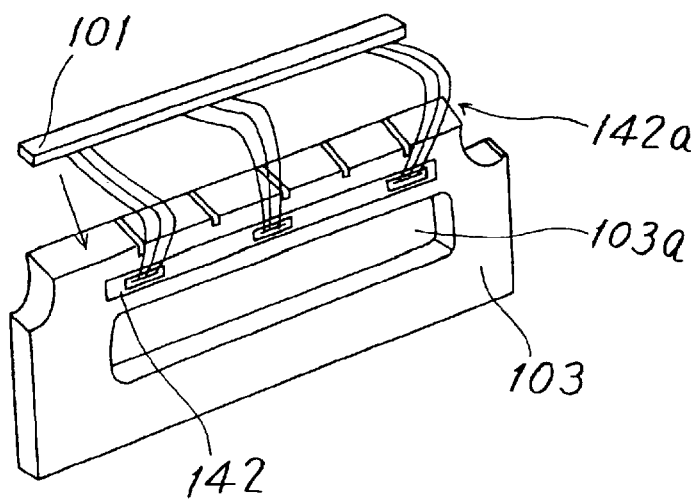
FIGS. 8A and 8B are explanatory diagrams of the mounting base shown in FIG. 2.
Figure 8B:
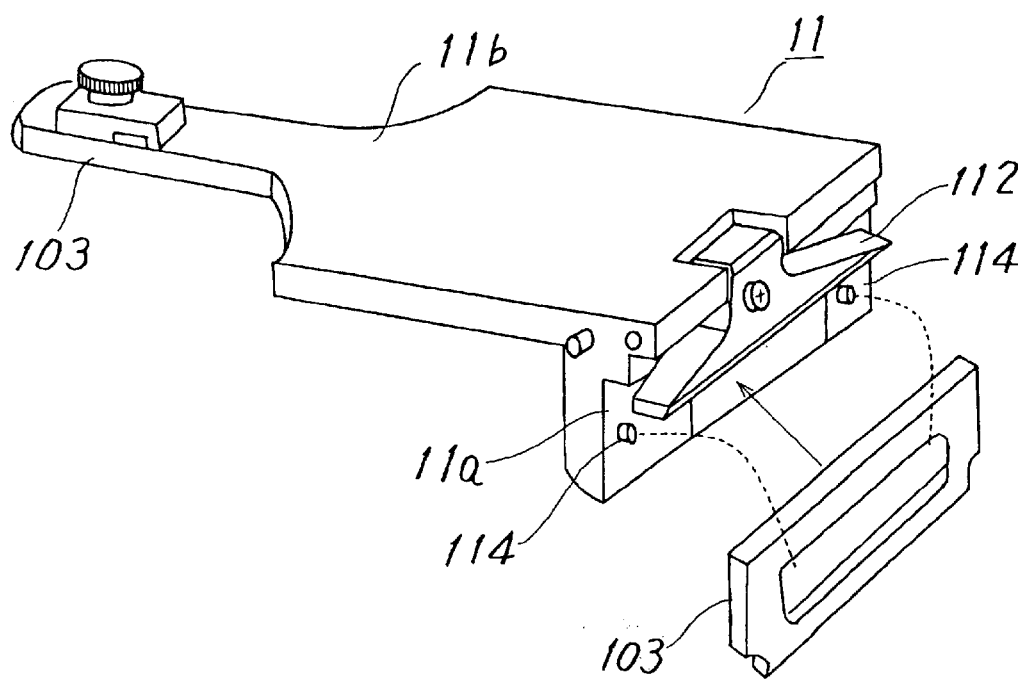
Figure 9:
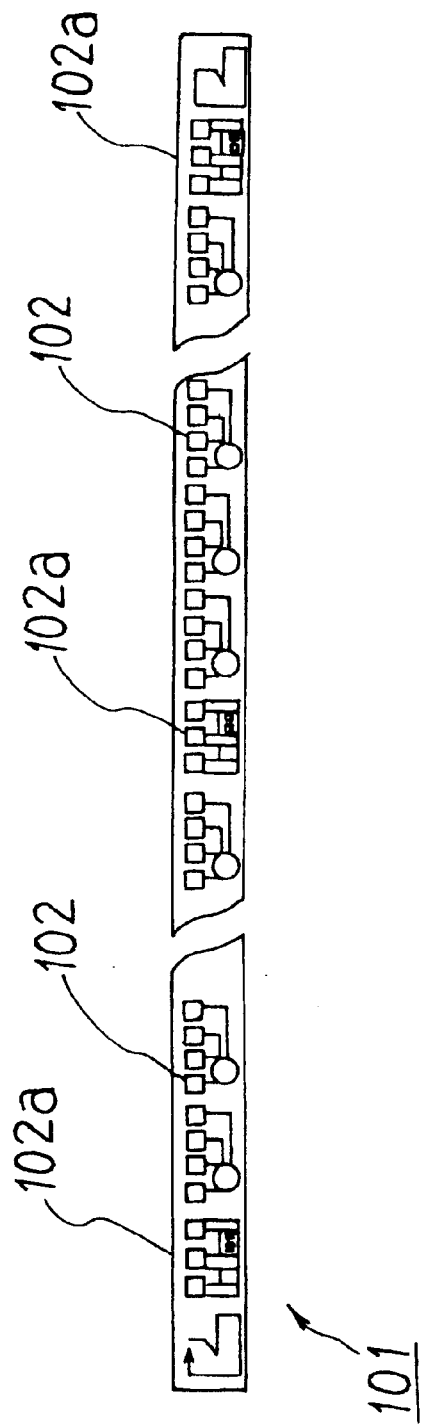
FIG. 9 is an explanatory diagram of a row bar shown in FIG. 8.
Figure 10:
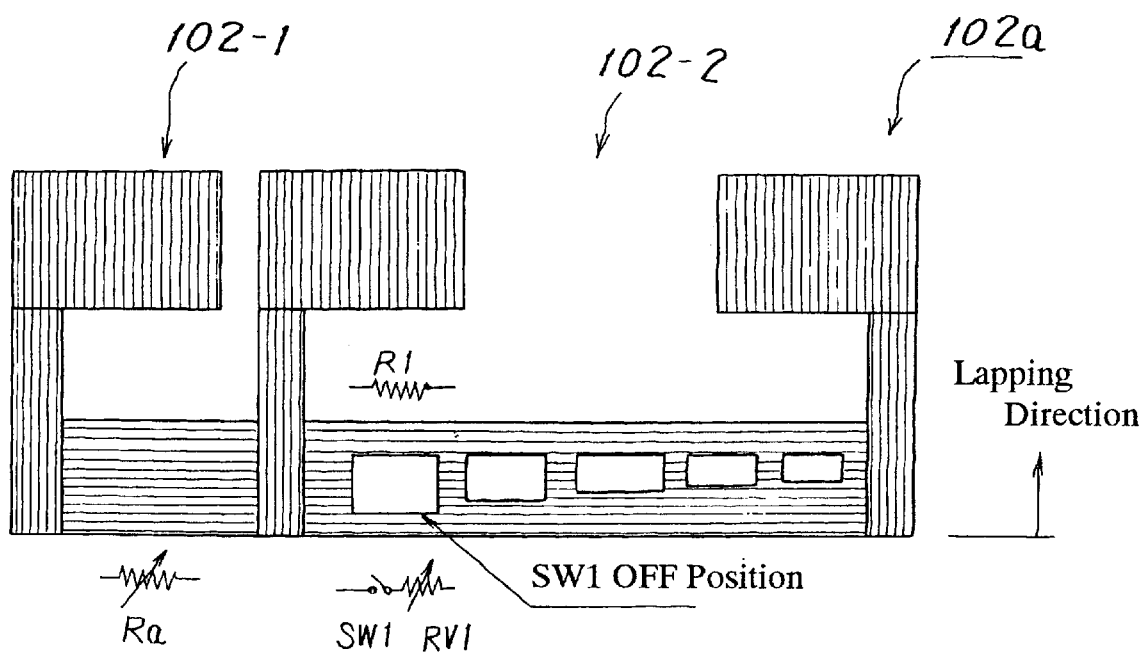
FIG. 10 is a structural diagram of an ELG element shown in FIG. 9.
Figure 11A:
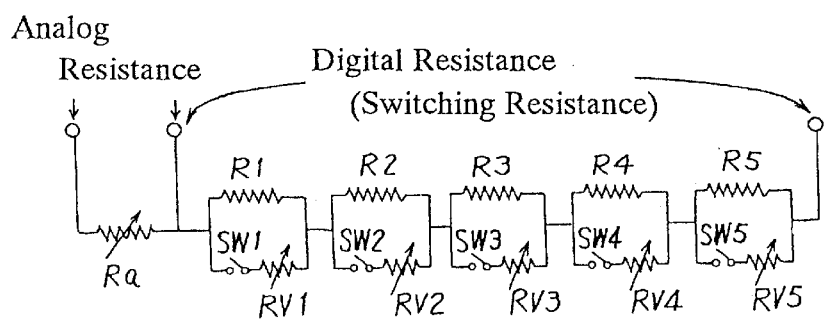
FIGS. 11A and 11B are explanatory diagrams of an ELG element shown in FIG. 10.
Figure 11B:
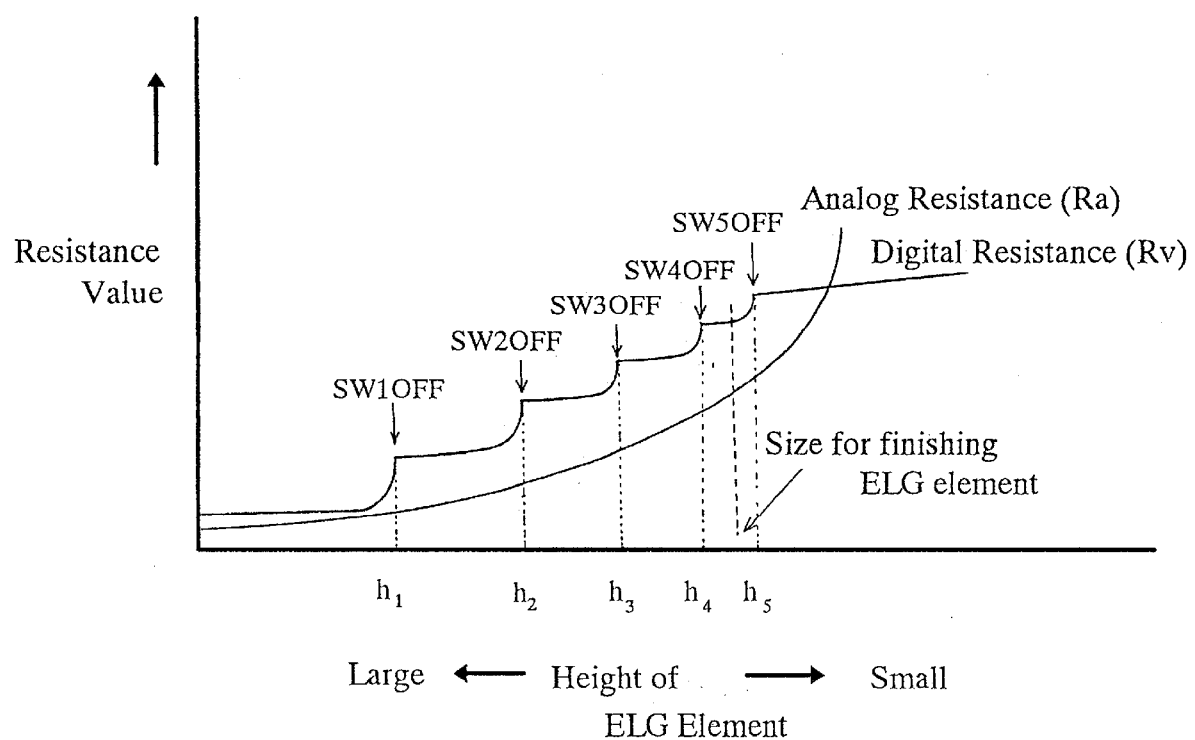

FIGS. 8A and 8B are explanatory diagrams of the mounting base 103, FIG. 9 is an explanatory diagram of a row bar 101, FIG. 10 is a structural diagram of an ELG element, and FIGS. 11A and 11B are explanatory diagrams of the ELG element.

As shown in FIG. 8A, the mounting base 103 has a mounting hole 103a. The row bar 101 is bonded on the mounting base 103. A terminal printed circuit board 142 is provided on the mounting base 103. The terminal printed circuit board 142 has a large space. The terminals of resistance elements for monitoring on the row bar 101 described later, i.e., ELG elements, are connected to terminals of the terminal printed circuit board 142 by bonding wires 142a.

The terminal space of ELG elements on the row bar 101 is small. Additionally, the terminals of the ELG elements are covered with the abrasive liquid. Therefore, even if the terminals are directly contacted to the probe 140, resistance measurements can not be stably executed. Therefore, in the present invention, the probe 140 is contacted to the terminal printed circuit board 142. As the terminal printed circuit board 142 can be provided on the position away from the lapping surface 104, and it may have a large terminal spare thereon. It becomes possible to execute stable resistance measurement.

As shown in FIG. 8B, the mounting base 103 may be mounted to the adapter 11. The adapter 11, which engages to a hole 103a of the mounting base 103 has protrusions 114 for supporting the mounting base 103, and a fixing block 112. The mounting base 103 is positioned by the protrusions 114, and is set between the first surface 11a and the fixing block 112.

As shown in FIG. 9, the row bar 101 includes a plurality of magnetic heads 102 and ELG elements 102a. The ELG elements 102a are provided on three positions of left, center, and right of the row bar 101.

As shown in FIG. 10, the ELG element is formed of an analog resistance 102-1 and a digital resistance 102-2. The analog resistance 102-1 has a pattern in which value of resistance becomes larger according to the reduction of the resistance film. The digital resistance 102-2 includes a pattern in which value of resistance becomes off when the resistance film is reduced until becoming to a constant value.

Therefore, an equivalent circuit is expressed as shown in FIG. 11A, and the analog resistance 102-2 is expressed as a variable resistance Ra. As shown in FIG. 11B, as reducing the height of the ELG element, the resistance values increases. The digital resistance 102-2 is expressed by five switch resistances as shown in FIG. 11A. Then, FIG. 11B shows a line graph showing variation on each of off positions of the resistances.

The value of the ELG element corresponds to a height of the ELG element. The relationship between the resistance value Ra of the ELG element and the height h of the ELG element can be nearly expressed in the following equation:

$$Ra = a/h + b \quad (1)$$

Coefficients a and b can be obtained by an experiment in advance. However, the characteristic is varied depending on each ELG element. The digital resistance is provided to compensate such the problem. The off positions h1 to h5 of the digital resistances are predetermined in advance. The off position of a digital resistance is detected and the measured resistance values and the off position are substituted for the equation (1). If two of the off points on the digital resistances can be detected, coefficients a and b in the equation (1) can be obtained.

The resistance values of the ELG element comes to the height of the ELG element in this equation (1). Thereby, it is possible to obtain the height of the ELG element by measuring the resistance values of the ELG element. Therefore, it can be judged whether or not the height of the ELG element has reached to a targeted value. As mentioned later, as the height of the ELG element is reached to the targeted value, lapping is stopped.

Figure 12:
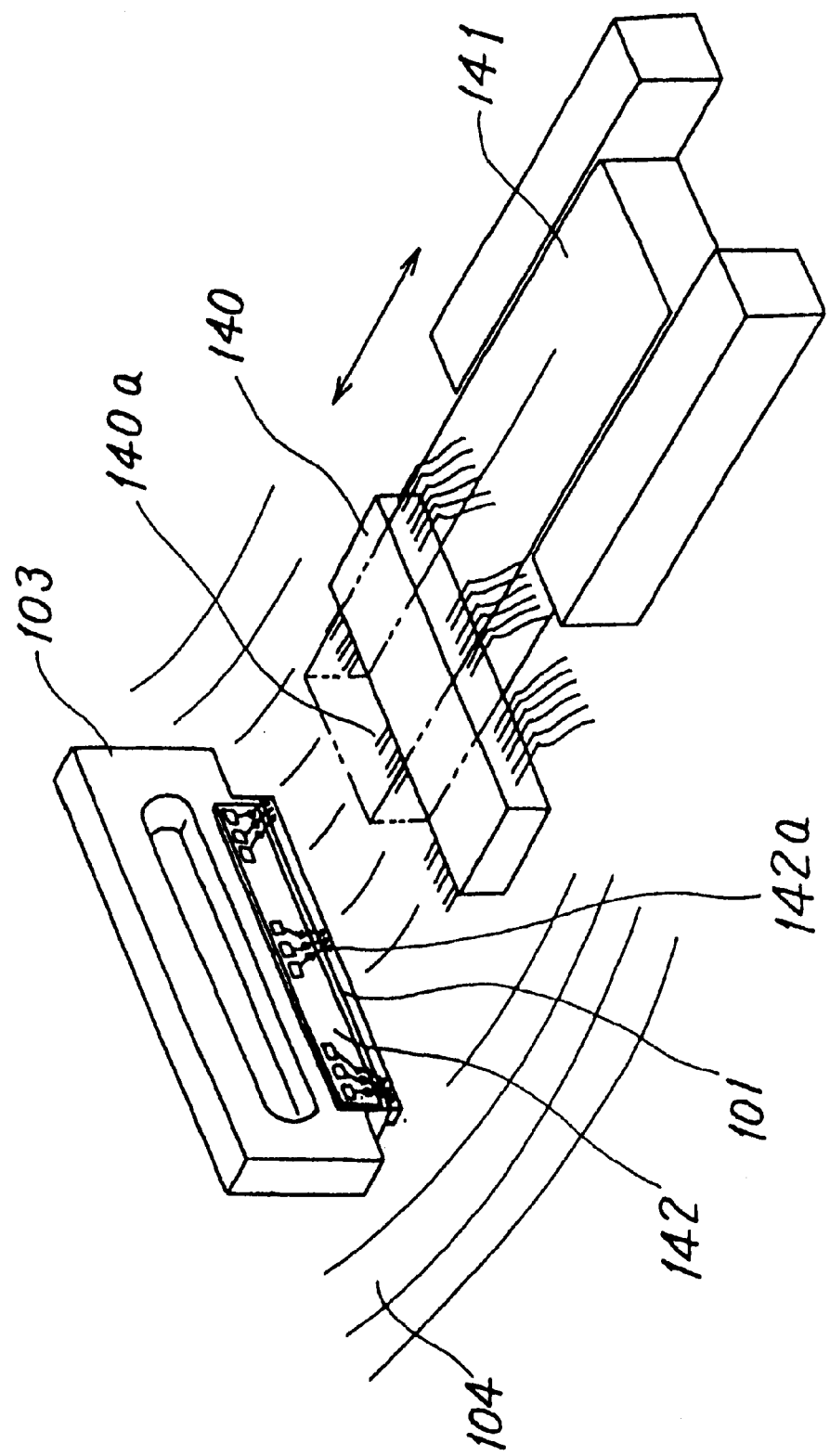
FIG. 12 is an explanatory diagram of a probe shown in FIG. 2.
Figure 13:
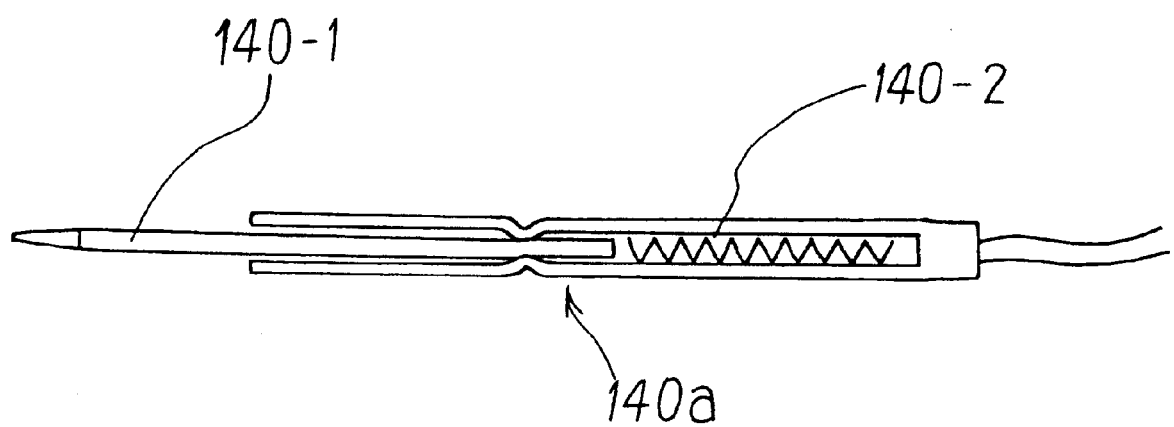
FIG. 13 is an explanatory diagram of a probe shown in FIG. 12.

FIG. 12 an explanatory diagram of a probe mechanism shown in FIG. 2, and FIG. 13 is an explanatory diagram of the probe shown in FIG. 12.

As shown in FIG. 12, the probe block 140 supports a plurality of probes 140a. The probe block 140 is moved by a probe cylinder 141. As shown in FIG. 13, each probe 140a has a probe body 140-1 and a spring 140-2.

The spring 140-2 pushes the probe body 140-1 to the terminal printed circuit board 142. Thereby, even when the mounting base 103 swings during lapping the work piece, the probe body 140-1 can be securely contacted to the terminals of the terminal printed circuit board 142.

The probe cylinder 141 pushes the probe block 140, so that the probe 140a may contact the terminal printed circuit board 142. On the other hand, the probe 140a is evacuated to easily set the adapter 11 on the lapping base 10.

Figure 14:
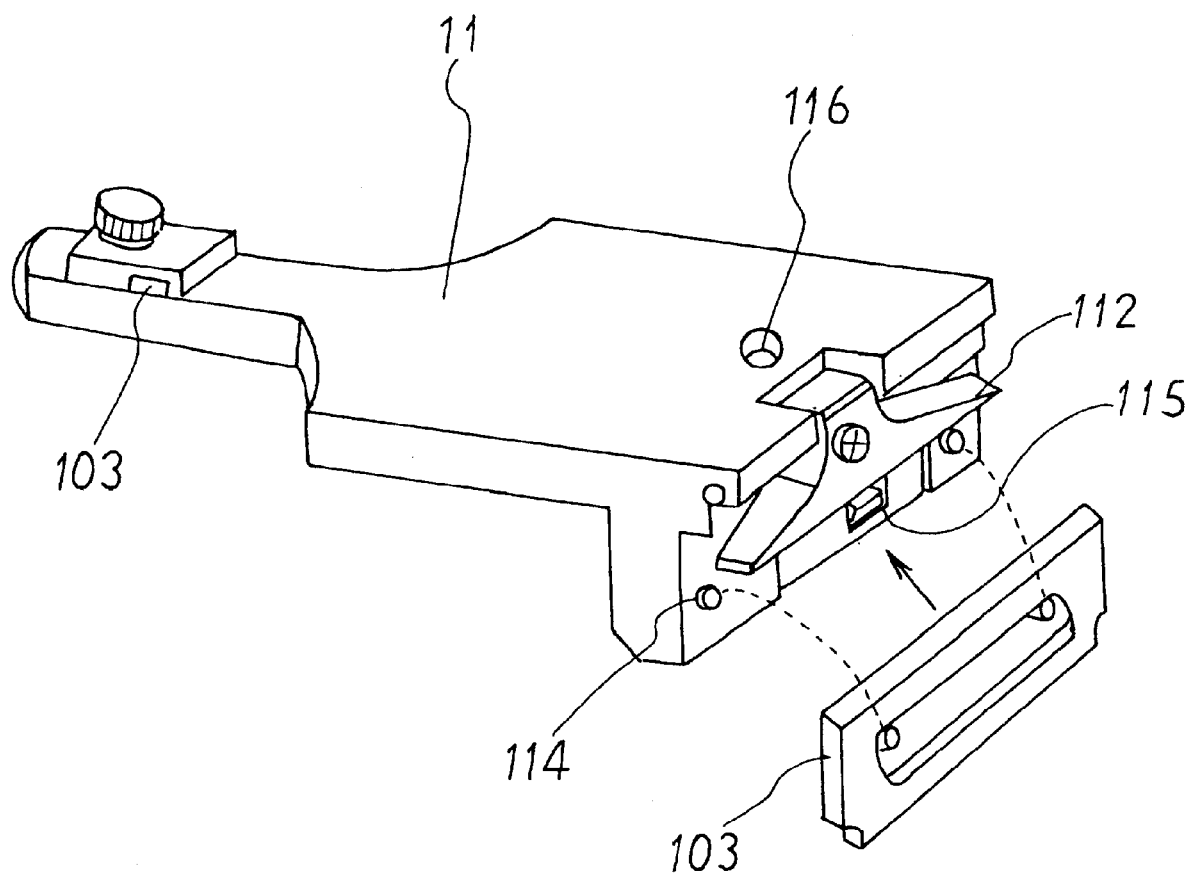
FIG. 14 is a structural diagram of a bending mechanism shown in FIG. 2.
Figure 15:
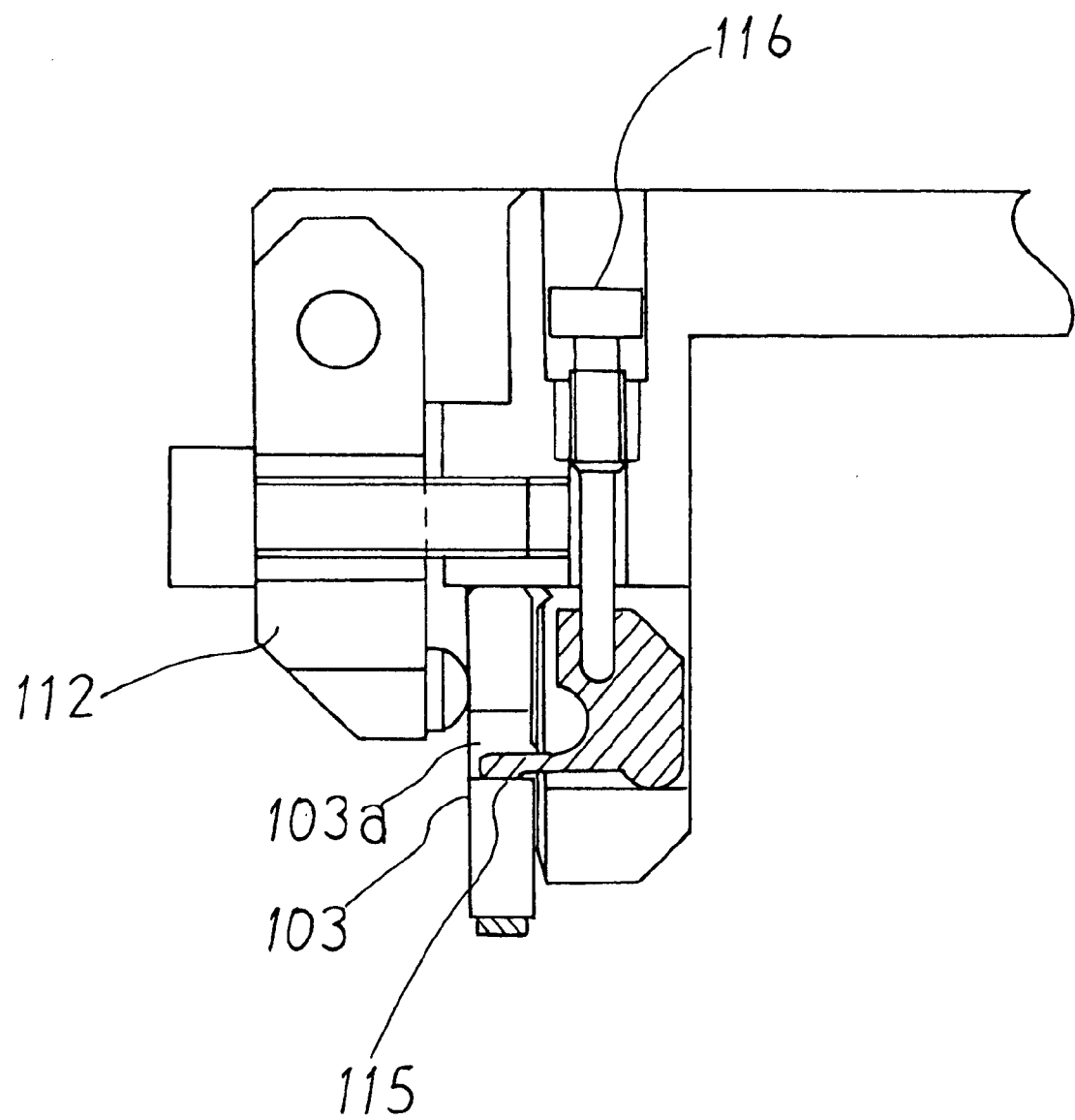
FIG. 15 is a cross sectional view of the bending mechanism shown in FIG. 14.
Figure 16A:
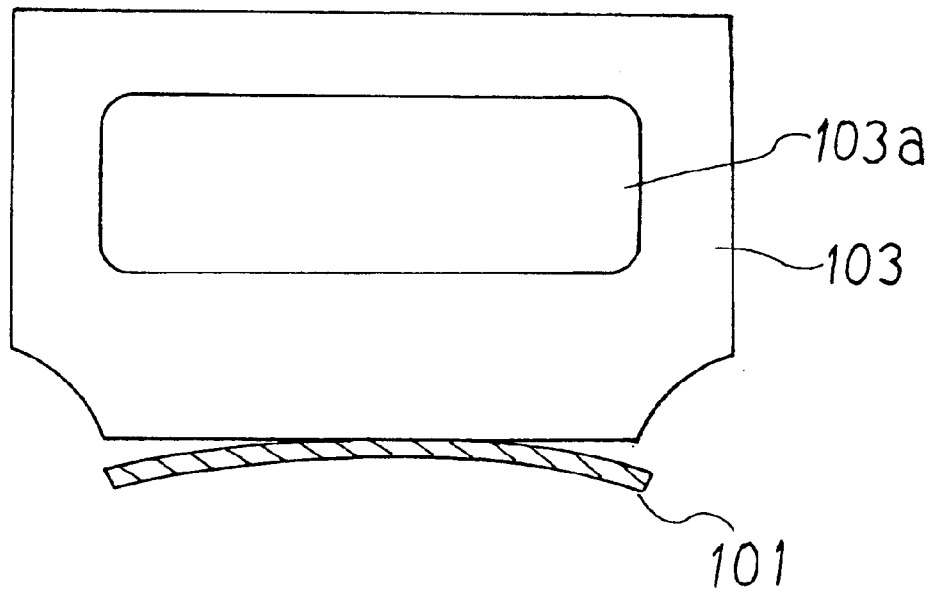
FIGS. 16A and 16B are explanatory diagrams of a bending operation of the bending mechanism shown in FIG. 14.
Figure 16B:
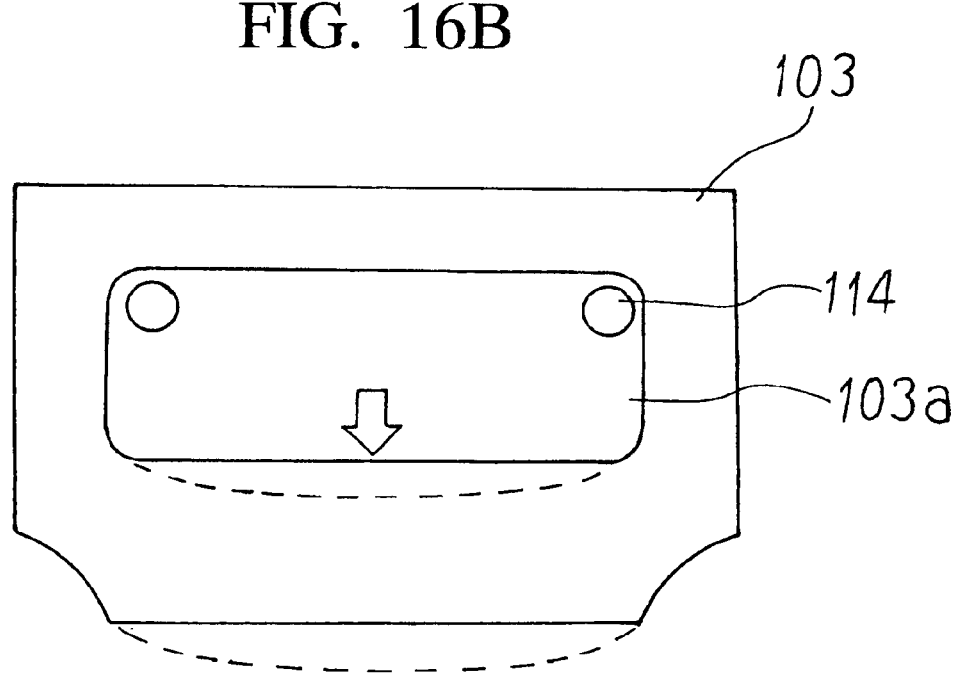
Figure 17:
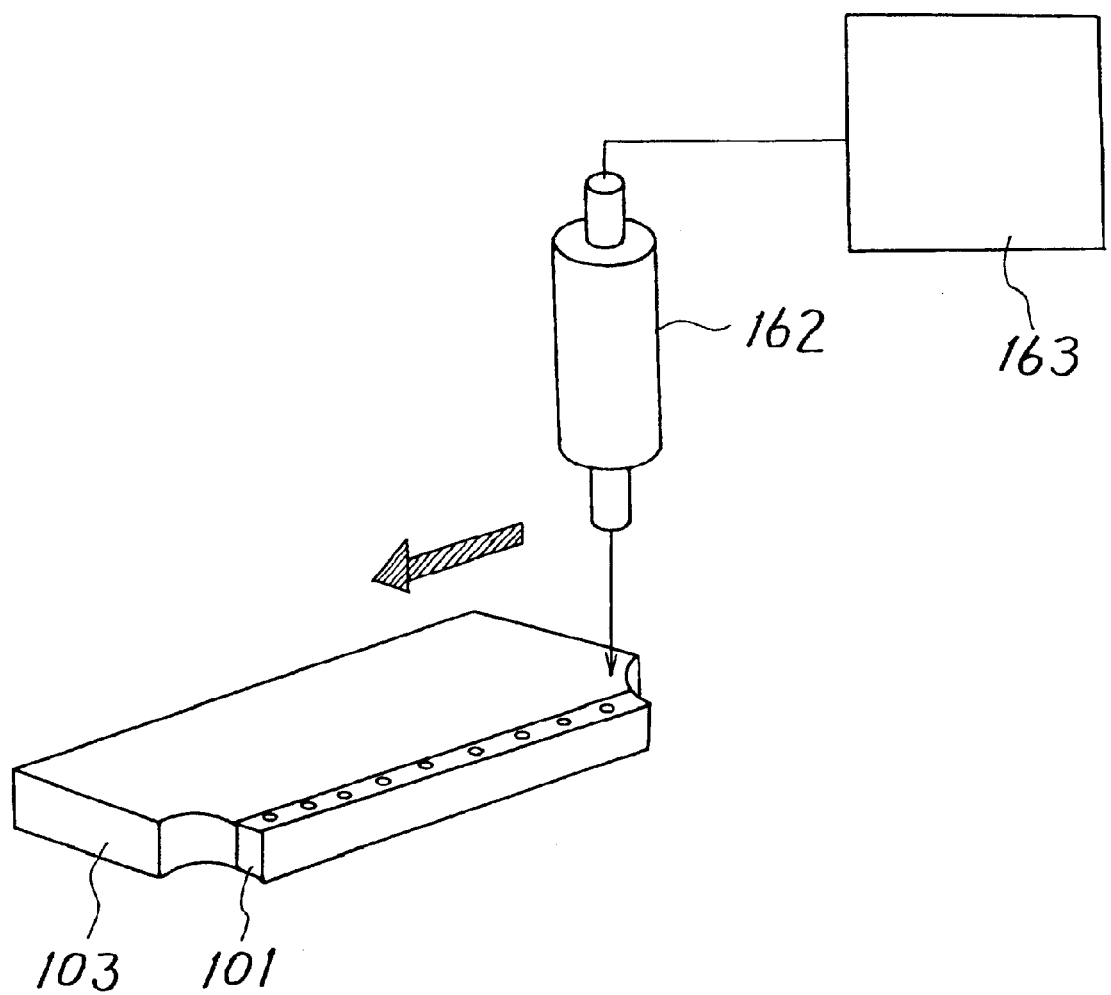
FIG. 17 is an explanatory diagram of a warp degree measurement operation for explanation of the bend mechanism show in FIG. 14.

FIG. 14 is a structural diagram of a bending mechanism shown in FIG. 2, FIG. 15 is a cross sectional view of a bending mechanism shown in FIG. 14, FIGS. 16A and 16B are explanatory diagrams of a bending operation, and FIG. 17 is an explanatory diagram of a warp measurement operation.

As shown in FIG. 16A, there is a case where the row bar 101 is warped and bonded to the mounting base 103. It is difficult to uniformly lap the work piece, that is the row bar 101, even when the warp is present in sub-microns.

A bending mechanism is provided on the adapter 11 in order to correct the warp. As shown in FIGS. 14 and 15, the bending mechanism includes a bending arm 115 and a screw for controlling bending. The bending arm 115 pushes a wall of the mounting hole 103a of the mounting base 103. The screw 116 controls the amount of pushing the wall by the bending arm 115.

As shown in FIGS. 16B, when the bending arm 115 pushes a center position of the lower section of the wall of the hole 103a, the mounting base 103 is warped and the warp of the row bar 101 is compensated. A mount of compensation is controlled by rotating the screw 116.

As shown in FIG. 17, after bonding the row bar 101 to the mounting base 103, the amount of the warp of the row bar 101 is measured. Markers for detecting the warp are provided on a side of the row bar 101. ACCD camera 162 takes a picture of the side of the row bar 101, and the arrangement of the elements in the row bar 101 is measured by the warp measurement section 163. Thereby, the amount of the warp may be measured. Then, the amount of the compensation is determined according to the amount of the warp.

Figure 18:
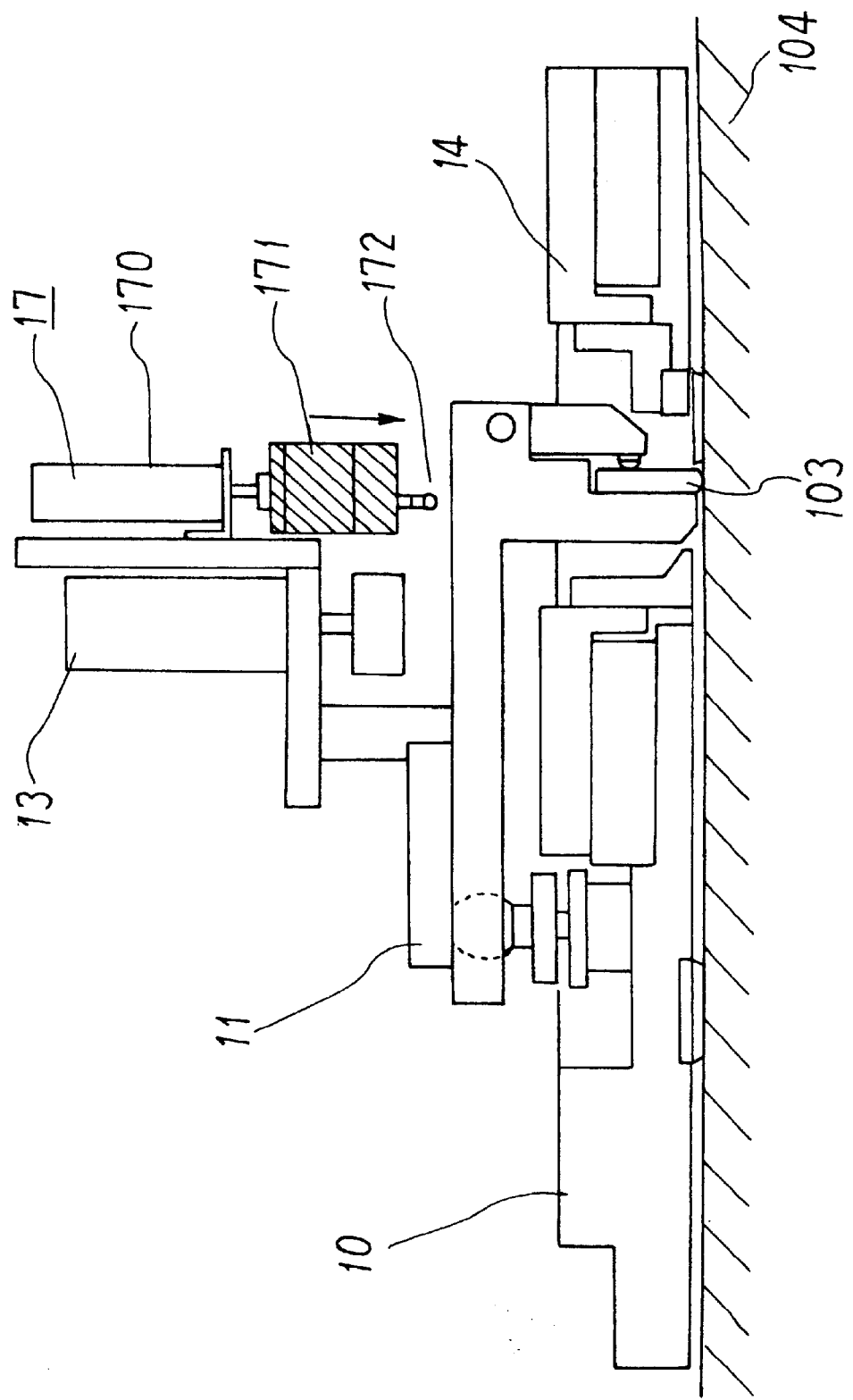
FIG. 18 is another explanatory diagram of the bending mechanism.

FIG. 18 is an explanatory diagram of another bending mechanism.

In this example, an automatic bending mechanism 17 is provided on the lapping base 10. A wrench 172 is engaged with the screw 116 for controlling bending, as shown in FIG. 15. A motor 171 rotates the wrench 172. A bending cylinder 170 drives the wrench 172 and the motor 171 toward the bending control screw 116.

In this example, the rotation amount of the motor 171 is controlled according to the measured warp amount to rotate the screw 116. Thereby, it becomes possible to automatically compensate the warp.

Figure 19:
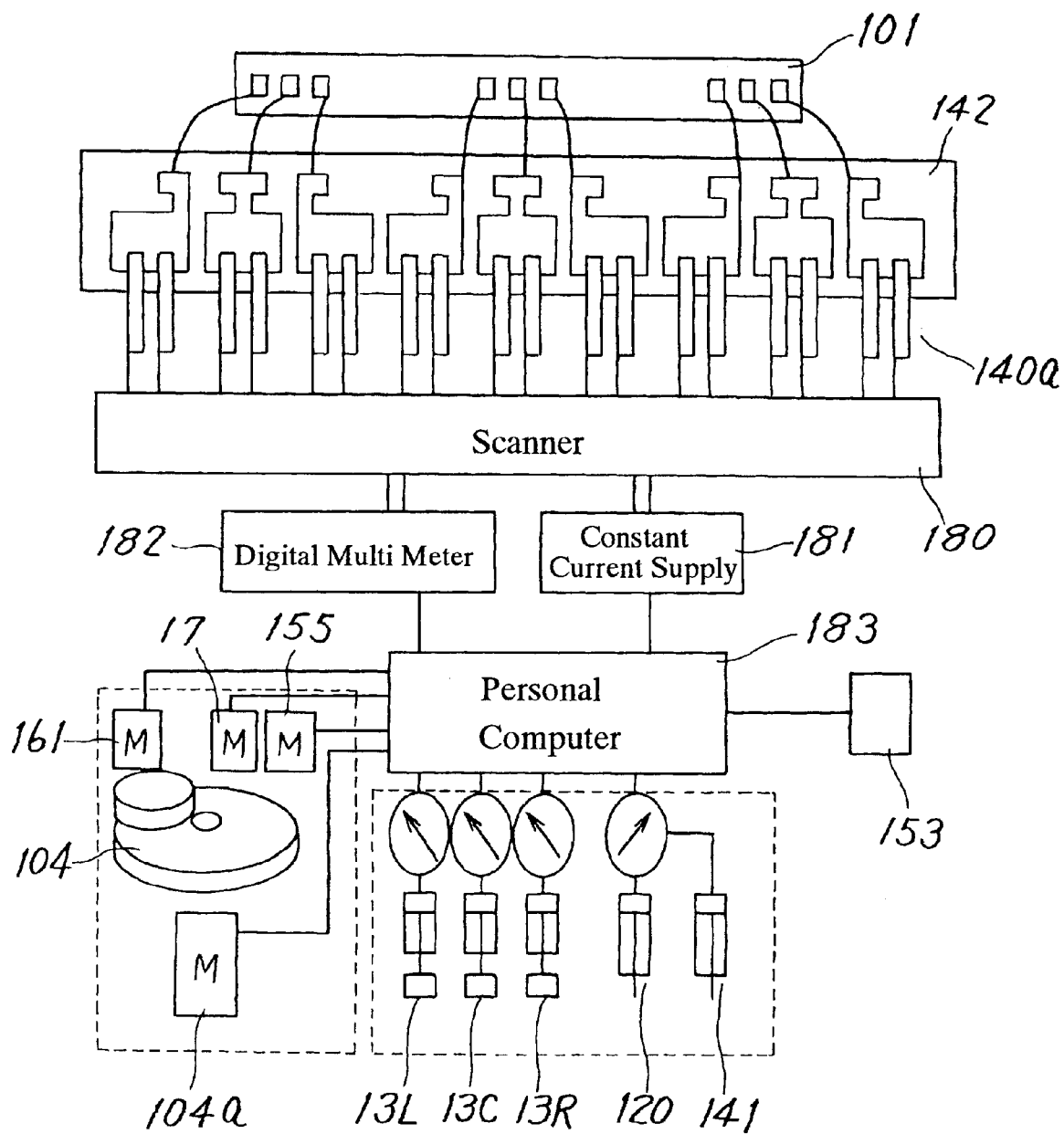
FIG. 19 is a block diagram of one embodiment according to the present invention.
Figures 20, 21:
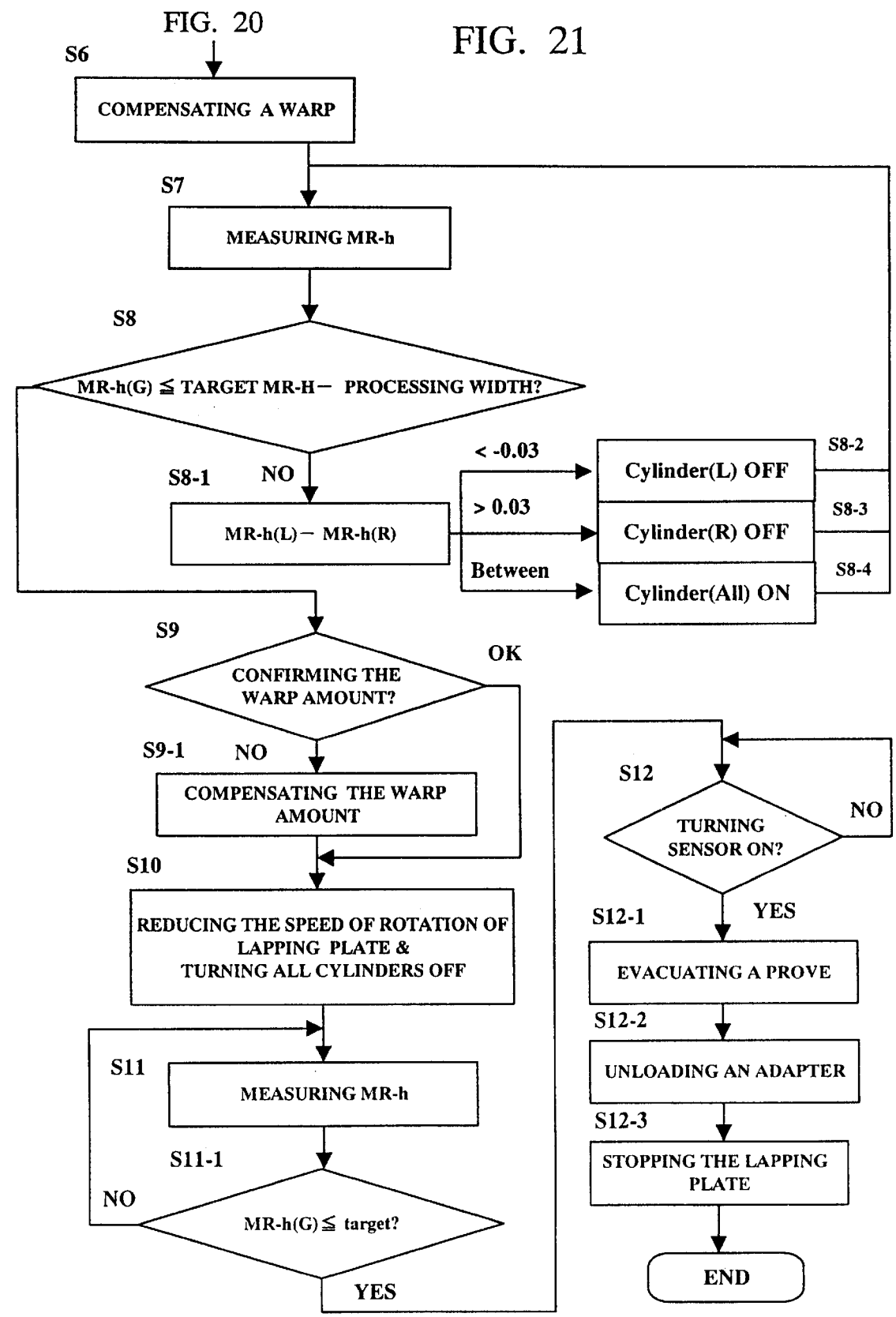
FIG. 20 is a first operational flowing chart shown in FIG. 19.
FIG. 21 is a second operational flowing chart shown in FIG. 19.
Figure 22:
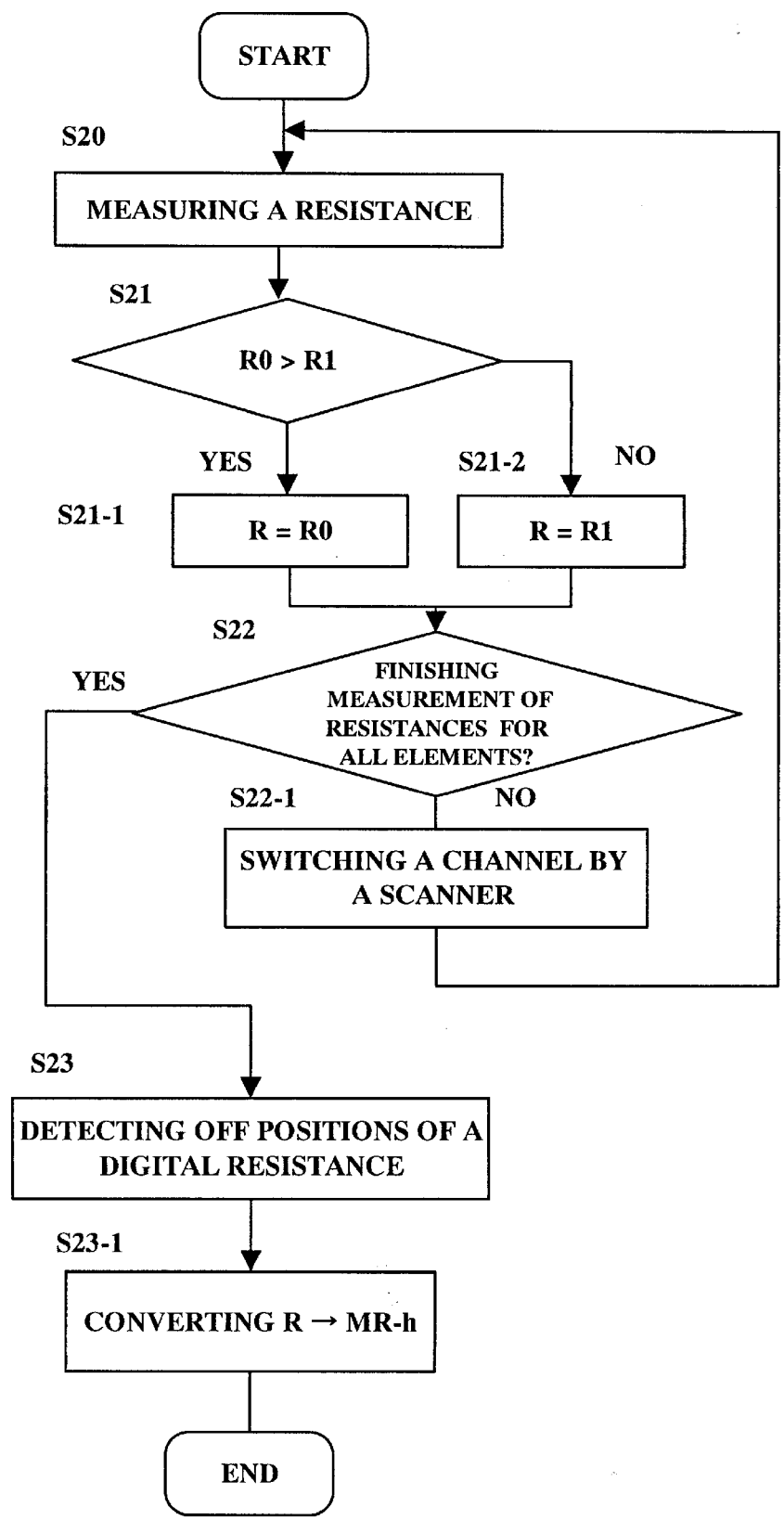
FIG. 22 is an operational flowing chart of measuring MR-h shown in FIG. 19.
Figure 23A:
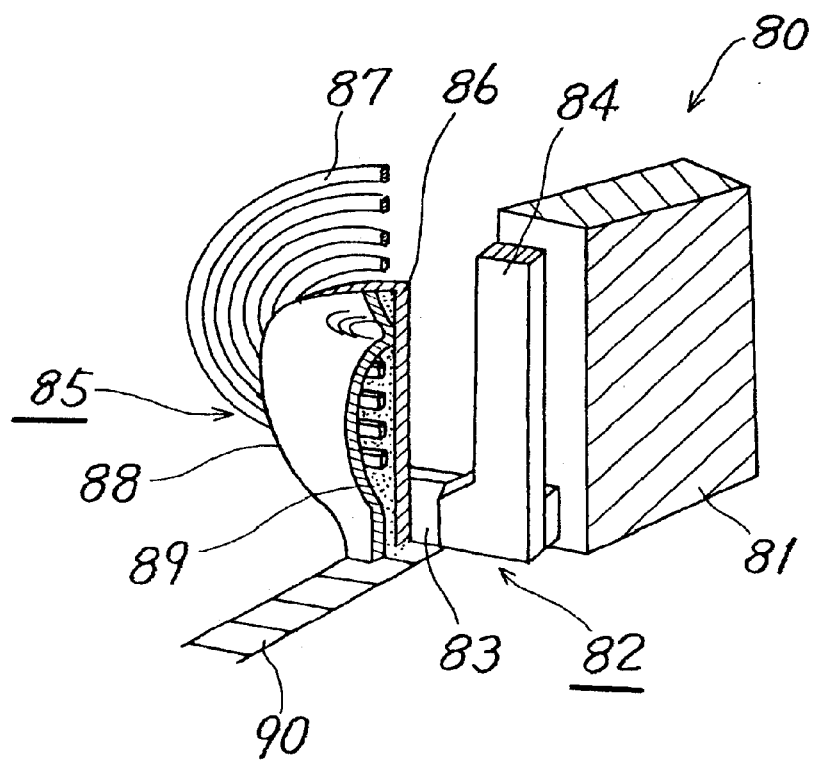
FIGS. 23A and 23B are explanatory diagrams of a composite type magnetic head.
Figure 23B:
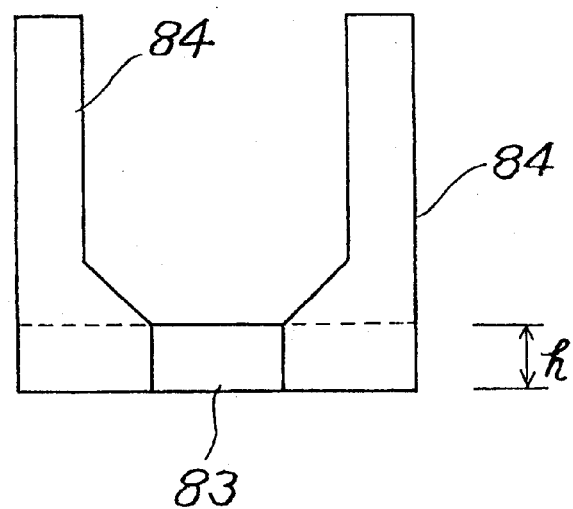
Figure 24A:
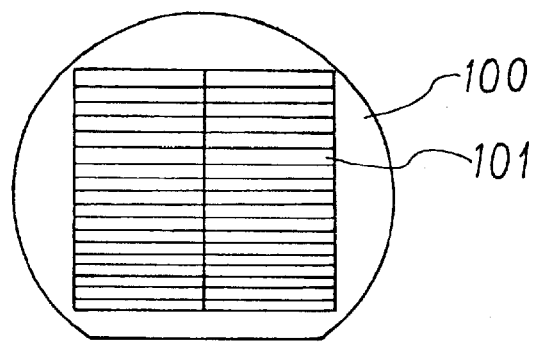
FIGS. 24A, 24B and 24C are first explanatory diagrams of a step for manufacturing the magnetic head.
Figure 24B:
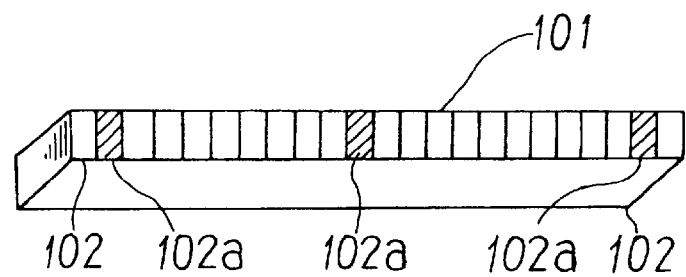
Figure 24C:
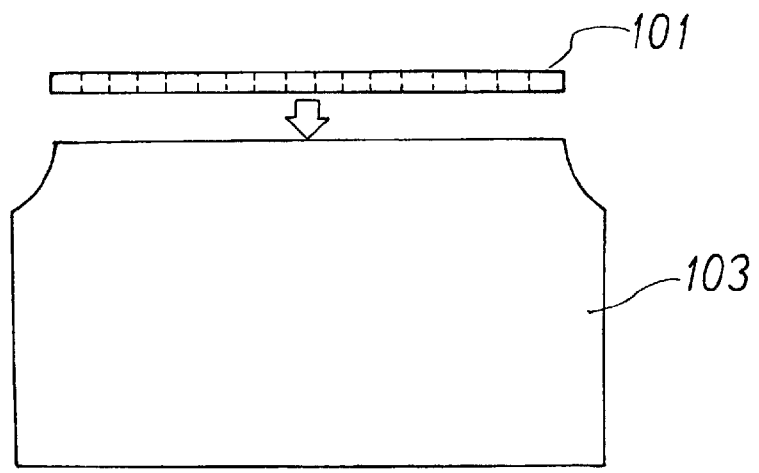
Figure 25A:
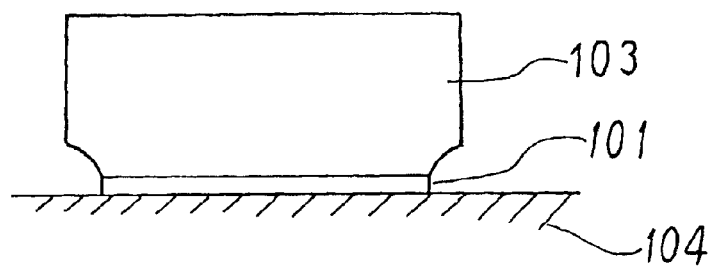
FIGS. 25A to 25D are second explanatory diagrams of a step for manufacturing the magnetic head.
Figure 25B:
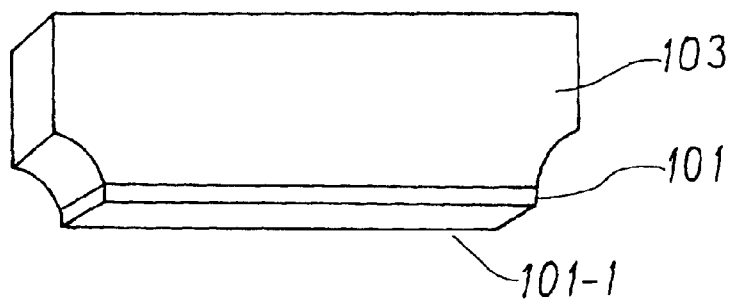
Figure 25C:
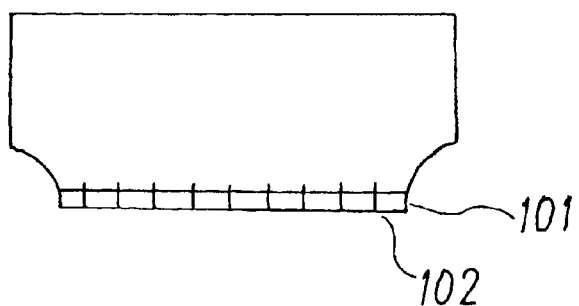
Figure 25D:
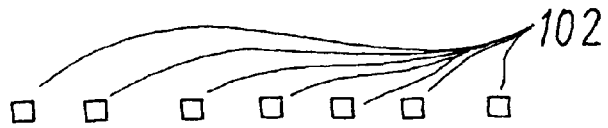
Figure 26:
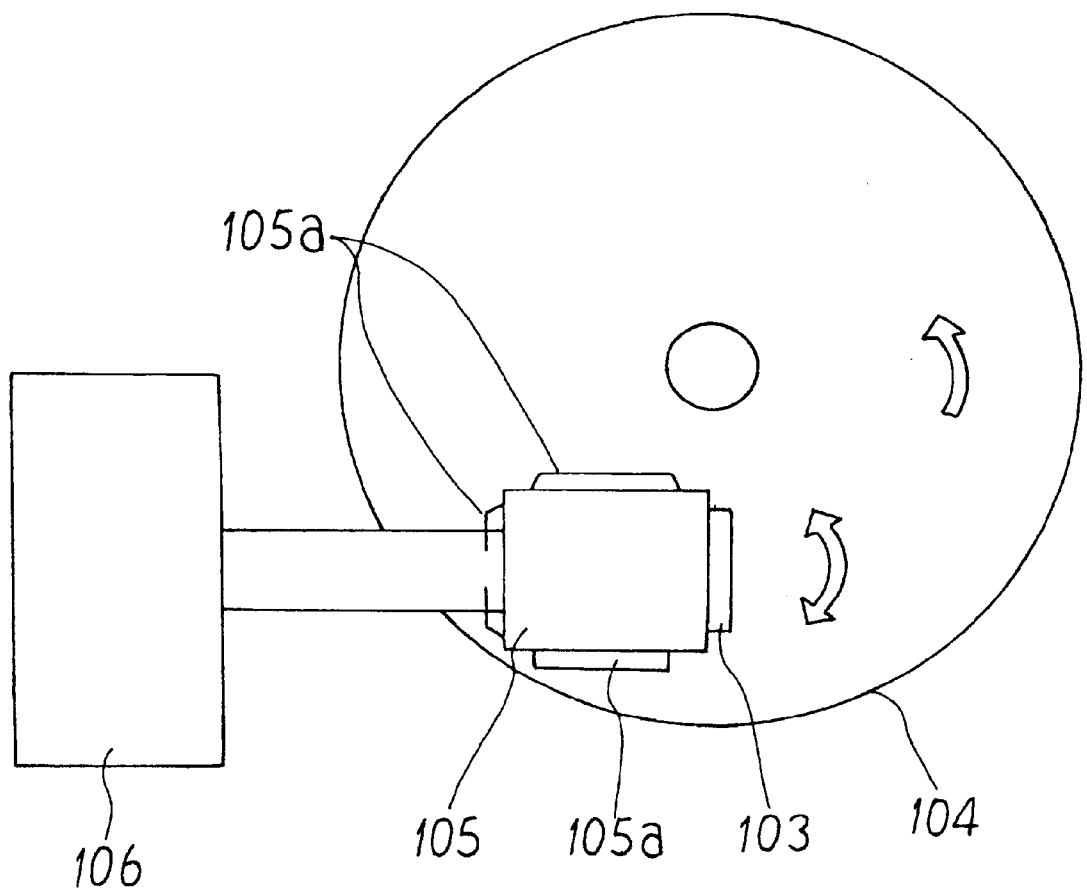
FIG. 26 is an explanatory diagram of the conventional lapping apparatus.
Figure 27A:
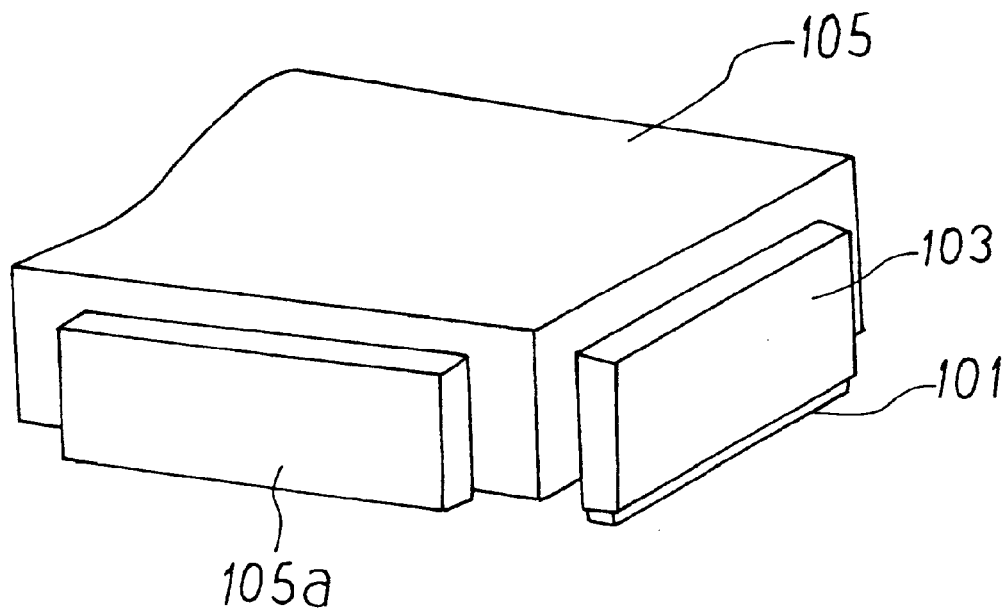
FIGS. 27A and 27B are explanatory diagrams of the conventional work supporting mechanism.
Figure 27B:
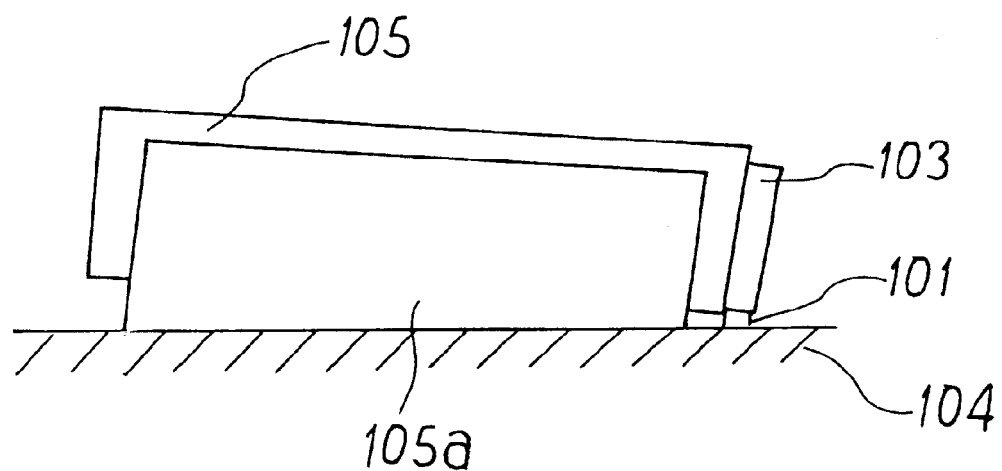

FIG. 19 is a block diagram of one embodiment according to the present invention, and FIGS. 20 and 21 are operational flowing charts of lapping the work in the one embodiment. FIG. 22 is an operational flowing chart of a MR-h measurement.

As shown in FIG. 19, a scanner 180 switches channels of each probe 140a. A constant current supply 181 supplies a constant current for resistance measurement. A digital multi meter 182 measures a voltage according to an output from the scanner 180 and converts the voltage into the value of resistance. A rotary motor 104a on the lapping plate rotates the lapping plate 104.

A personal computer (hereinafter called as a controller) 183 converts the measured value of resistance outputted from the digital multi-meter 182 into the height of the ELG element (MR-h) to control each section. That is, the controller 183 controls a swing motor 155 on a lapping plate 104, a bending motor 171, a correction ring motor 161, and a rotary motor 104a. The controller 183 controls each of the pressure cylinders 13L, 13C and 13R. The controller 183 further controls a cylinder 120 for the unload mechanism 12 and a cylinder 141 for the probe mechanism 14. The controller 183 receives an output of the swing sensor 15 of the swing mechanism to control the unload mechanism 12.

Hereinafter, a processing by the controller 183 will be explained in accompanying with FIGS. 20 and 21.

At first, initial values are inputted by employing an input unit of the controller 183 (STEP S1). The initial values are, for example, the number of a semiconductor wafer, a row bar address or the like. After inputting the initial values, an operator sets the adapter 11 on the lapping base 10, and then, turns a start switch on (STEP S1-1).

The controller 183 activates the lapping plate 104 to be rotated (STEP S2). That is, the controller 183 makes the motor 104a rotate in order to rotate the lapping plate 104 in high speed. The controller 183 rotates a swing motor 155 for swing operation. The controller 183 further rotates the modified ring motor 161. The controller 183 starts to supply slurry.

Then, the controller 183 turns the center cylinder 13C on (STEP S2-1). Thereby, pre-lapping or smoothing is performed with the load of the one pressure cylinder. Burrs are removed from the row bar 101 by the smoothing.

The controller 183 reads the resistance value from the digital multi meter 182 to measure MR-h explained in FIG. 22 (STEP S3). The controller 183 starts a timer to count from the starting of lapping the work piece, and judges whether or not the value of the timer has become 60 seconds. If the value of the timer is within 60 seconds, the controller 183 measures MR-h (STEP S3-1). That is, smoothing is performed for 60 seconds. While smoothing, the controller 183 measures MR-h to detect off positions of the digital resistance described above.

The controller 183 finishes smoothing after elapsing 60 seconds. Then, the controller 183 turns all cylinders 13L, 13C and 13R of the pressure mechanism 13 on (STEP S4). That is, the controller 183 chamfers the surface of the work piece 101 by adding the load. The chamfering may prevent the ELG element 102a on the row bar 101 from being shorted.

The controller 183 reads the resistance value from the digital multi meter 182 to measure MR-h explained in FIG. 22 (STEP S5). The controller 183 judges whether or not MR-h of all ELG elements positioned on the left side, the center and the right side are less than 8.0 microns (STEP S5-1). If the MR-h of all ELG elements are not less than 8.0 microns, the controller 183 continues measuring the MR-h.

This is because the present applicant found that partial short status can be removed if All of MR-h reach to 8.0 microns. As the resistance value on the ELG element shows an abnormal value on the partial short status, the controller 183 removes the status.

After removing the short status, the warp compensation and light-left difference compensation are performed (STEP S6). The controller 183 rotates the bending motor 171 described in FIG. 18 to compensate the warp. The amount of the compensation is inputted to the controller 183 by measurement operation explained in FIG. 17. The controller 183 controls the bending motor 171 by the use of the compensation value.

The controller 183 reads the resistance value from the digital multi meter 182 and measures MR-h, as explained in FIG. 22 (STEP S7).

The controller 183, in order to obtain the height of the ELG element at the center of gravity, calculates an average value between the MR-h (L) which is the height of the left ELG element and the MR-h (R) which is the height of the right ELG element. Then, the controller 183 calculates an average value between the average value obtained from the above-described calculation and the MR-h (C) which is the height of the center ELG element to obtain the MR-h (G) which is the height of the ELG element on the center of gravity. The controller 183 judges whether or not the MR-h (G) on the center of gravity is less than (the targeted MR-h—the finishing width) (STEP S8). If the MR-h (G) of the ELG element on the center of the gravity is not less than (the targeted MR-h—the finishing width), left-right difference modification is performed. The controller 183 finds a difference X between the MR-h (L) which is the height of the left ELG element and the MR-h (R) which is the height of the right ELG element (STEP S8-1).

If the difference X is more than −0.03 microns, the right end of the row bar 101 is 0.03 microns (allowable amount) higher than the left end. Therefore, the left pressure cylinder 13L in the pressure mechanism 13 is turned to off to lighten the load on the left end, and then returning back to the step S7 (STEP S8-2).

On the other hand, the difference X is more than 0.03 microns, the left end of the row bar 101 is 0.03 microns (allowable amount) higher than the right end. Therefore, the right cylinder 13R is turned to off to lighten the load on the right end, and then, returning back to the step S7 (STEP S8-3).

When the difference X is between −0.03 microns and 0.03 microns, the left-right difference of the row bar 101 is in the allowable range. Then, all of the pressure cylinders 13L, 13C and 13R are turned to on, and returning back to the step S7 (STEP S8-4).

The controller 183 confirms the warp amount (STEP S9). At first, a difference Y between of the MR-h (C) which is the height of the center ELG element and the average value between the MR-h of the heights of the ELG elements on the left and right ends is obtained. The controller 183 judges whether or not the difference Y is more than the allowable value 0.03 microns. If the difference is not more than 0.03 microns, going to the next step S10. On the other hand, the difference Y is more than the allowable value, the warp compensation amount explained in the step S6 is performed (STEP S9-1). The compensation amount is obtained from the above-described difference Y.

The controller 183 goes to the finishing process. Then, the controller 183 controls the motor 104a to reduce the rotation speed of the surface plate 104. The controller 183 turns all of the pressure cylinders 13L, 13C and 13R in the pressure mechanism 13 to off. The finishing process is performed without giving the load (STEP S10).

The controller 183 reads the resistance value from the digital multi meter 182 to measure the MR-h described in FIG. 22 (STEP S11). The controller 183 judges whether or not the MR-h (G) that is the height of the ELG element on the center of gravity is less than the targeted value (STEP S11-1).

When the controller 183 detects that the height MR-h (G) is less than the targeted value, the processing is controlled for finishing. The controller 183 judges whether or not the swing sensor 153 described in FIG. 3 is turned to on (STEP S12). When the swing sensor 153 is turned to on, as described above, the lapping base 10 is positioned on the predetermined position P.

The controller 183 activates the probe cylinder 141 to evacuate the probe 140 (STEP S12-1). Next, the controller 183 activates the unload cylinder 120 of the unload mechanism 12 to evacuate the mounting base 103 from the lapping plate 104 (STEP S12-2). Then, the controller 183 stops the lapping plate 104 and finishes the processing (STEP S12-3).

In this way, the smoothing process (pre-processing) to the finishing process are continuously executed by changing conditions for the lapping. Therefore, it is possible to realize high productivity differently in comparison with the apparatus in which smoothing and finishing processes are discontinuously or separately executed. Further, it is also possible to save an operator trouble.

The MR-h measurement will be explained according to FIG. 22.

The controller 183 reads the resistance value from the digital multi meter 182 (STEP S20).

The controller 183 compares the previously measured resistance value R0 with the just measured resistance value R1 (STEP S21). If the previously measured resistance value R0 is larger than the value R1, the previously measured value R0 is employed as the resistance value R (STEP S21-1). If the value R0 is not larger than the value R1, the value R1 is employed as the value R (STEP S21-2).

As explained in FIG. 11B, the value of resistance becomes larger, depending on the reduction of the height of the element. Accordingly, if it is normal, a value on a later sampling is larger than a value of resistance on a previously measured sampling. However, there is a case where the value of resistance becomes abnormal due to a partial short status of the element or influence of abrasive liquid. To remove the abnormal value of resistance, the following processing is performed:

The controller 183 judges whether or not the resistance values of all ELG elements have been measured (STEP S22). If the measurement has not been finished for all ELG elements, a channel of the scanner 180 is switched, and the processing is returned to the step s20 (STEP S22-1).

When The controller 183 finishes the measurement of the resistance values for all ELG elements, the controller 183 detects an off position of the digital resistance element from the variation of the resistance value (STEP S23). As described above, when the controller 183 detects the off position of the digital resistance element, the controller 183 obtains coefficients shown in the equation (1). The controller 183 converts the measured resistance value R into the height MR-h and finishes the processing (STEP S23-1).

In this way, the mounting base 103 is set on the adapter 11 supported at points of the lapping base 10. Therefore, the processing surface of the work piece can be moved independently from the processing surface of the lapping base. As the adapter 11 is supported on two points of the mounting base 103 and one supporting point, the lapping surface of the work piece may follow and be lapped as the lapping plate.

The work piece is lapped based on the lapping plate. Therefore, it is possible to lap the work piece smoothly regardless of the accuracy of the lapping base, thus realizing the accuracy of lapping the work piece.

Although the present invention has been described with reference to embodiments, the invention is not restricted to those. The following modification can be applicable.

(1) In the above-described embodiments, a row bar formed of a row of the magnetic heads as lapped parts is explained as one example. However, it is possible to apply the present invention to lap other parts.

(2) Other elements can be used as the elements for monitoring.

As explained above, the present invention takes effect as follows:

(1) As a mounting plate, to which a work piece is mounted, is provided on an adapter supported at points on a lapping base, the adapter for supporting the mounting base is supported by three points of two points of the mounting base and one supporting point. Therefore, the processing surface of the work piece may follow and be lapped as the lapping plate. Therefore, it is possible to lap the work piece flatly regardless of accuracy of the lapping base.

(2) Thereby, it is possible to realize accuracy of lapping the work piece.

The present invention may be embodied in other specific forms without departing from the sprit or essential characteristics thereof. It should of course be understood that those which are the same as the technical concept of the invention are within the protective scope of the present invention.

What is claimed is:

1. A lapping apparatus for lapping a work piece comprising:

a lapping plate which moves relatively to said work piece;

a lapping base including a plurality of pads contacting to said lapping plate;

an adapter having first and second surfaces for supporting said work piece to contact to said lapping plate; and a supporting mechanism provided on said lapping base for supporting said second surface of said adapter by one supporting point.

2. The lapping apparatus according to claim 1, wherein said supporting mechanism includes an adjusting mechanism for adjusting the height of said adapter.

3. The lapping apparatus according to claim 1, wherein said supporting mechanism includes a spherical supporting portion for supporting said adapter.

4. The lapping apparatus according to claim 1, further comprising:

a mounting base, to which the work piece is bonded, wherein said adapter has a fixing member for fixing said mounting base on said first surface.

5. The lapping apparatus according to claim 4, further comprising:

an unload mechanism provided on said lapping base for evacuating said work piece bonded to the mounting base from said lapping plate.

6. The lapping apparatus according to claim 5, comprising:

a controller for activating said unload mechanism when finishing lapping of said work piece.

7. The lapping apparatus according to claim 5 or 6, further comprising:

a swing mechanism for swinging said lapping base on said lapping plate; and a control part for detecting said work piece positioned at the central position in a swinging range of the lapping base, and controlling said unload mechanism.

8. The lapping apparatus according to claim 7, further comprising:

a detecting mechanism for detecting said work piece is positioned at the central position in said swinging range.

9. The lapping apparatus according to claim 4, comprising:

a bending mechanism provided on said adapter for correcting a warp of said work piece bonded to the mounting base.

10. The lapping apparatus according to claim 9, wherein said mounting base has a bending arm contacted to said work piece, and the bending mechanism has a control mechanism for controlling an amount contacting to the work piece of said bending arm.

11. The lapping apparatus according to claim 9, comprising:

a control part for controlling said bending mechanism.

12. The lapping apparatus according to claim 1, further comprising:

a pressure mechanism provided on said lapping base for putting pressure on said work piece.

13. The lapping apparatus according to claim 12, wherein said pressure mechanism has a plurality of pressure cylinders independently for putting pressure on different portions of the work piece.

14. The lapping apparatus according to claim 13, further comprising:

a controlling part for independently controlling said plurality of pressure cylinders.

15. The lapping apparatus according to claim 1, wherein said work piece includes elements, of which resistance values are varied according to the amount of lapping, and further comprising:

a probe mechanism for electrically contacting to terminals of said elements, and a control means operatively connected to said probe mechanism for detecting the resistance values of said elements and monitoring the status of lapping the work piece.

16. The lapping apparatus according to claim 15, wherein said probe mechanism has probes for contacting the terminals of said element and an evacuating mechanism for evacuating said probe from said work piece.

* * * * *

UNITED STATES PATENT AND TRADEMARK OFFICE
CERTIFICATE OF CORRECTION

PATENT NO. : 5,899,793
DATED : May 4, 1999
INVENTOR(S) : Yanagida et al.

It is certified that error appears in the above-identified patent and that said Letters Patent is hereby corrected as shown below:

On the Title Page:

Item "[57] Abstract" delete the present Abstract and insert the following Abstract:

-- A lapping apparatus for uniformly lapping work pieces includes a rotary lapping plate, a lapping base including a plurality of pads contacting the lapping plate and an adapter including first and second surfaces for supporting the mounting base contacting the lapping plate. Also included is a supporting mechanism provided on the lapping base for supporting the second surface of the adapter by a supporting point.--

UNITED STATES PATENT AND TRADEMARK OFFICE
CERTIFICATE OF CORRECTION

PATENT NO. : 5,899,793
DATED : May 4, 1999
INVENTOR(S) : Yanagida et al.

It is certified that error appears in the above-identified patent and that said Letters Patent is hereby corrected as shown below:

Column 1, line 46, delete "on" and insert --during-- therefor

Column 1, line 50, delete "uniformed" and insert --uniform-- therefor

Column 2, line 37, delete "105a, further, may" and insert --105a may further-- therefor Column 2, line 58, delete "bounded" and insert --bonded-- therefor Column 3, line 2, delete "are wearing" and insert --wear-- therefor Column 3, line 17, delete "perpendicular" and insert --perspective-- therefor

UNITED STATES PATENT AND TRADEMARK OFFICE
CERTIFICATE OF CORRECTION

PATENT NO. : 5,899,793
DATED : May 4, 1999
INVENTOR(S) : Yanagida et al.

It is certified that error appears in the above-identified patent and that said Letters Patent is hereby corrected as shown below:

Column 3, line 57, delete "flowing" and insert --flow-- therefor

Column 3, line 59, delete "flowing" and insert --flow-- therefor

Column 3, line 61, delete "flowing" and insert --flow-- therefor

Column 4, line 10, delete "be"

Column 4, line 11, after "now" insert --be--

Column 4, line 11, delete "in" and insert --with reference to the-- therefor

Column 4, line 11, delete "with the attached"

UNITED STATES PATENT AND TRADEMARK OFFICE
CERTIFICATE OF CORRECTION

PATENT NO. : 5,899,793
DATED : May 4, 1999
INVENTOR(S) : Yanagida et al.

It is certified that error appears in the above-identified patent and that said Letters Patent is hereby corrected as shown below:

Column 4, line 15, delete "an" and insert --a-- therefor

Column 4, line 53, after "on" insert --the--

Column 5, line 5, delete "a" and insert --an-- therefor

Column 5, line 20, after "and" insert --by--

Column 5, line 41, delete "an" and insert --a-- therefor

Column 5, line 44, delete "electrically"

Column 5, line 44, after "which" insert --electrically--

UNITED STATES PATENT AND TRADEMARK OFFICE
CERTIFICATE OF CORRECTION

PATENT NO. : 5,899,793
DATED : May 4, 1999
INVENTOR(S) : Yanagida et al.

It is certified that error appears in the above-identified patent and that said Letters Patent is hereby corrected as shown below:

Column 5, line 44, delete "an" and insert

--a-- therefor

Column 6, line 20, delete "in accompanying"

Column 6, line 21, after "with" insert

--reference to--

Column 6, line 39, delete "around"

Column 6, line 56, after "of" insert --the--

Column 6, line 59, delete "The" and insert

--When the-- therefor

Column 6, line 59, delete "that"

Column 6, line 61, delete "to"

Column 6, line 63, delete "from"

UNITED STATES PATENT AND TRADEMARK OFFICE
CERTIFICATE OF CORRECTION

PATENT NO. : 5,899,793
DATED : May 4, 1999
INVENTOR(S) : Yanagida et al.

It is certified that error appears in the above-identified patent and that said Letters Patent is hereby corrected as shown below:

Column 7, line 25, after "engages" delete "to"

Column 7, line 41, after "which" insert --the--

Column 7, line 42, delete "to"

Column 7, line 46, delete "values" and insert --value-- therefor

Column 7, line 49, after "of" insert --the--

Column 8, line 6, delete "to"

Column 8, line 7, delete "is reached to" and insert --reaches-- therefor

UNITED STATES PATENT AND TRADEMARK OFFICE
CERTIFICATE OF CORRECTION

PATENT NO. : 5,899,793
DATED : May 4, 1999
INVENTOR(S) : Yanagida et al.

It is certified that error appears in the above-identified patent and that said Letters Patent is hereby corrected as shown below:

Column 8, line 8, delete "is stopped" and insert --stops-- therefor

Column 8, line 9, after "12" insert --is--

Column 8, line 40, after "pushing" insert --on--

Column 8, line 50, delete "ACCD" and insert --A CCD-- therefor

Column 9, line 3, delete "flowing" and insert --flow-- therefor

Column 9, line 8, delete "multi" and insert --multimeter-- therefor

Column 9, line 9, delete "meter"

Column 9, line 13, delete "as"

UNITED STATES PATENT AND TRADEMARK OFFICE
CERTIFICATE OF CORRECTION

PATENT NO. : 5,899,793
DATED : May 4, 1999
INVENTOR(S) : Yanagida et al.

It is certified that error appears in the above-identified patent and that said Letters Patent is hereby corrected as shown below:

Column 9, line 15, delete "multi-meter" and insert --multimeter-- therefor

Column 9, line 26, delete "in accompanying"

Column 9, line 26, after "with" insert --reference to--

Column 9, line 45, delete "multi meter" and insert --multimeter--

Column 9, line 46, delete "from"

Column 9, line 62, delete "multi meter" and insert --multimeter-- therefor

Column 10, line 2, delete "All" and insert --all-- therefor

UNITED STATES PATENT AND TRADEMARK OFFICE
CERTIFICATE OF CORRECTION

PATENT NO. : 5,899,793
DATED : May 4, 1999
INVENTOR(S) : Yanagida et al.

It is certified that error appears in the above-identified patent and that said Letters Patent is hereby corrected as shown below:

Column 10, line 2, after "of" insert --the--

Column 10, line 15, delete "multi meter" and insert --multimeter-- therefor

Column 10, line 50, delete "returning" and insert --return-- therefor

Column 10, line 58, after "value" insert --of--

Column 10, line 59, after "hand," insert --if--

Column 11, line 4, delete "multi meter" and insert --multimeter-- therefor

Column 11, line 32, delete "multi meter" and insert --multimeter-- therefor

UNITED STATES PATENT AND TRADEMARK OFFICE
CERTIFICATE OF CORRECTION

PATENT NO. : 5,899,793
DATED : May 4, 1999
INVENTOR(S) : Yanagida et al.

It is certified that error appears in the above-identified patent and that said Letters Patent is hereby corrected as shown below:

Column 11, line 53, delete "s20" and insert

--S20-- therefor

Column 11, line 54, delete "The" and insert

--the-- therefor

Column 12, line 19, after "mounted," insert

--which--

Column 12, line 21, after "points" insert

--consisting--

Column 12, line 36, delete "said" and insert

--the-- therefor

Column 12, line 37, delete "to"

UNITED STATES PATENT AND TRADEMARK OFFICE
CERTIFICATE OF CORRECTION

PATENT NO. : 5,899,793
DATED : May 4, 1999
INVENTOR(S) : Yanagida et al.

It is certified that error appears in the above-identified patent and that said Letters Patent is hereby corrected as shown below:

Column 12, line 40, delete "said" and insert

--the-- therefor

Column 12, line 40, delete "to"

Column 12, line 47, delete "the", and insert

--a-- therefor

Column 12, line 60, delete "said", and insert

--the-- therefor

Column 12, line 60, delete "the" and insert

--said-- therefor

Column 13, line 8, delete "said" and insert

--that the-- therefor

UNITED STATES PATENT AND TRADEMARK OFFICE
CERTIFICATE OF CORRECTION

PATENT NO. : 5,899,793
DATED : May 4, 1999
INVENTOR(S) : Yanagida et al.

It is certified that error appears in the above-identified patent and that said Letters Patent is hereby corrected as shown below:

Column 13, line 14, delete "of said" and insert --on the-- therefor

Column 13, line 14, delete "the" and insert --said-- therefor

Column 13, line 18, delete "contacted" and insert --contacting-- therefor

Column 13, line 19, delete "to said" and insert --the-- therefor

Column 13, line 19, delete "the" and insert --said-- therefor

Column 13, line 20, delete "contact."

UNITED STATES PATENT AND TRADEMARK OFFICE
CERTIFICATE OF CORRECTION

PATENT NO. : 5,899,793
DATED : May 4, 1999
INVENTOR(S) : Yanagida et al.

It is certified that error appears in the above-identified patent and that said Letters Patent is hereby corrected as shown below:

Column 13, line 21, delete "ing to" and insert --said to ending arm contacts-- and delete "of said bending arm"

Column 13, line 21, delete "of said bending arm"

Column 14, line 2, delete "said" and insert --the--

Column 14, line 5, delete "independently for" and insert --for independently-- therefor Column 14, line 13, delete "said" and insert --the-- therefor Column 14, line 16, delete "to".

Column 14, line 17, delete "a"

Signed and Sealed this

Second Day of January, 2001

Attest:

Q. TODD DICKINSON
*Attesting Officer*  *Commissioner of Patents and Trademarks*

UNITED STATES PATENT AND TRADEMARK OFFICE
CERTIFICATE OF CORRECTION

PATENT NO. : 5,899,793
DATED : May 4, 1999
INVENTOR(S) : Yanagida et al.

It is certified that error appears in the above-identified patent and that said Letters Patent is hereby corrected as shown below:

Column 14, line 20, after "lapping" insert

--on-- therefor

Column 14, line 23, delete "the" and insert

--said-- therefor

Column 14, line 24, delete "probe" and insert --probes-- therefor

Column 14, line 24, delete "said" and insert

--the-- therefor

Signed and Sealed this

Second Day of January, 2001

Attest:

Q. TODD DICKINSON

*Attesting Officer* — *Commissioner of Patents and Trademarks*